US010247945B2

(12) United States Patent
Takagi et al.

(10) Patent No.: US 10,247,945 B2
(45) Date of Patent: Apr. 2, 2019

(54) VIRTUAL IMAGE DISPLAY APPARATUS

(71) Applicant: SEIKO EPSON CORPORATION, Tokyo (JP)

(72) Inventors: Masayuki Takagi, Matsumoto (JP); Takahiro Totani, Suwa (JP); Takashi Takeda, Suwa (JP); Akira Komatsu, Tatsuno-machi (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 69 days.

(21) Appl. No.: 15/374,656

(22) Filed: Dec. 9, 2016

(65) Prior Publication Data

US 2017/0184854 A1 Jun. 29, 2017

(30) Foreign Application Priority Data

Dec. 25, 2015 (JP) ................................. 2015-253152

(51) Int. Cl.
*G02B 27/01* (2006.01)
*G02B 6/10* (2006.01)
(Continued)

(52) U.S. Cl.
CPC ......... *G02B 27/0172* (2013.01); *G02B 6/002* (2013.01); *G02B 6/0045* (2013.01); *G02B 6/10* (2013.01); *H04N 9/3141* (2013.01); *G02B 5/005* (2013.01); *G02B 2027/0112* (2013.01); *G02B 2027/0118* (2013.01);
(Continued)

(58) Field of Classification Search
CPC G02B 27/0172; G02B 27/01; G02B 27/0101;
G02B 27/0149; G02B 27/017; G02B 27/0176; G02B 27/0179; G02B 5/005; G02B 5/006; G06T 19/006; H04N 13/044; H04N 5/7491
USPC ............ 359/13–14, 618, 629–633, 739–740; 345/7–9; 348/113–120; 349/11
See application file for complete search history.

(56) References Cited

U.S. PATENT DOCUMENTS 9,116,342 B2 8/2015 Totani et al.
2011/0310352 A1* 12/2011 Nakano ................ G03B 21/208
353/20

(Continued)

FOREIGN PATENT DOCUMENTS

JP 2014-038226 A 2/2014
JP 2015-072438 A 4/2015
WO 2015/033534 A1 3/2015

*Primary Examiner* — Kristina M Deherrera
(74) *Attorney, Agent, or Firm* — Oliff PLC

(57) ABSTRACT

In a projection system, providing a stop that forms an opening that is symmetric with respect to a first flat plane including the projection system optical axis and a first axis that extends in parallel to the first direction and intersects the projection system optical axis but asymmetric with respect to a second flat surface including the projection system optical axis and a second axis that extends in parallel to the second direction and intersects the projection system optical axis allows appropriate light adjustment at the stop even when pencils of light from the points in a video device exit at different angles along a second direction, whereby high-quality video images can be provided with the size of an optical system further reduced and therefore the size of an overall virtual image display apparatus reduced.

17 Claims, 13 Drawing Sheets

(51) Int. Cl.
*H04N 9/31* (2006.01)
*F21V 8/00* (2006.01)
*G02B 5/00* (2006.01)

(52) U.S. Cl.
CPC ............... *G02B 2027/0121* (2013.01); *G02B 2027/0145* (2013.01); *G02B 2027/0178* (2013.01)

(56) References Cited

U.S. PATENT DOCUMENTS

| | | |
|---|---|---|
| 2014/0049833 A1 | 2/2014 | Totani et al. |
| 2014/0268356 A1* | 9/2014 | Bolas ............... G02B 27/0093 359/630 |
| 2016/0178909 A1 | 6/2016 | Komatsu et al. |

* cited by examiner

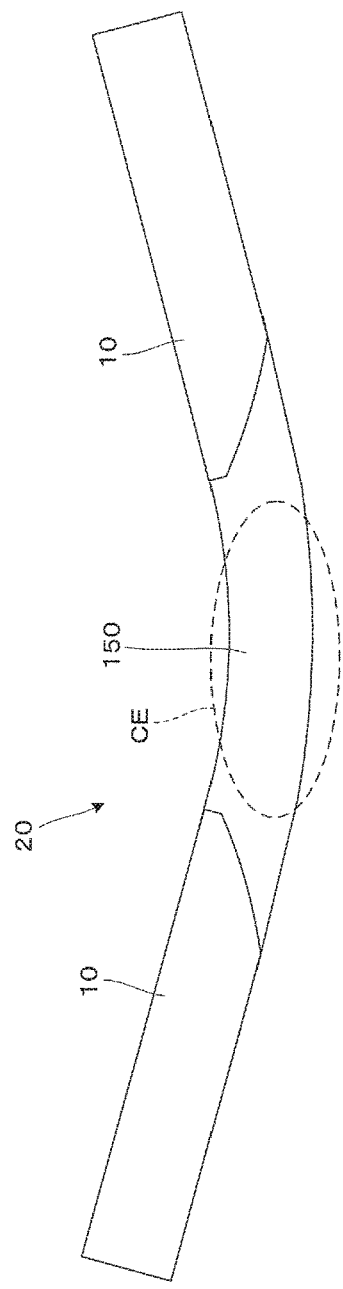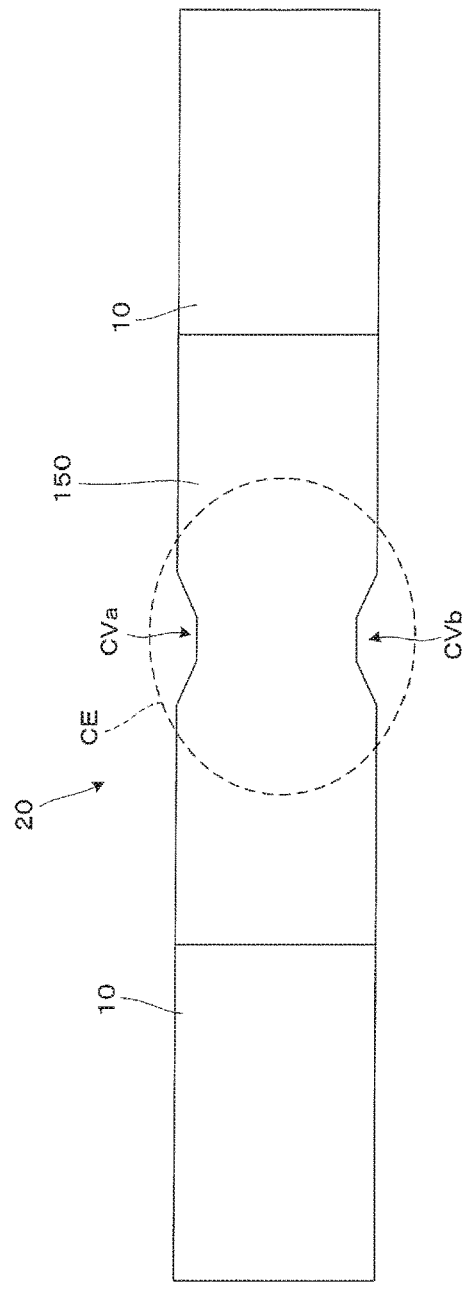

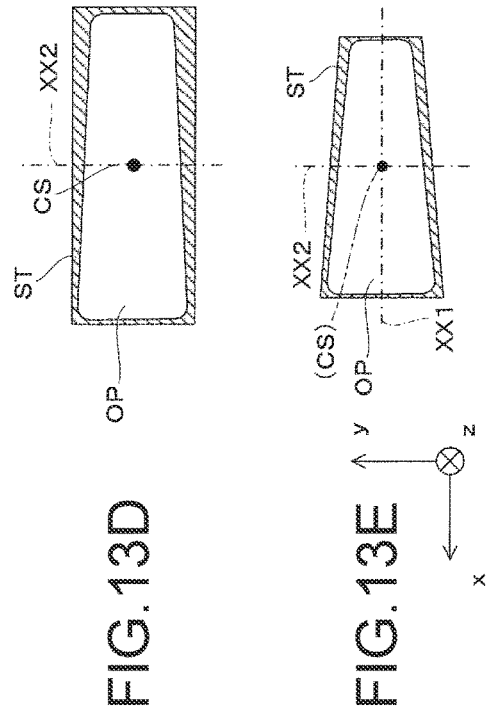
FIG. 13D
FIG. 13E
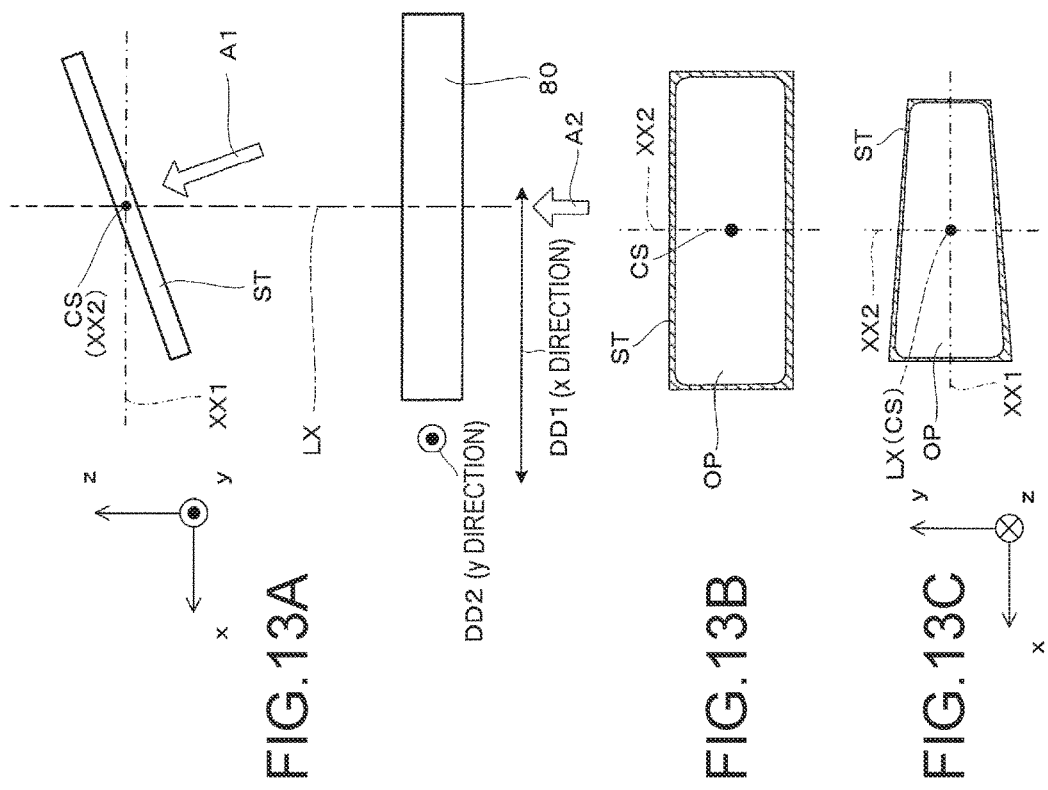
FIG. 13A
FIG. 13B
FIG. 13C

VIRTUAL IMAGE DISPLAY APPARATUS

BACKGROUND

1. Technical Field

The present invention relates to a virtual image display apparatus that presents a viewer with video images formed by an image display apparatus (video device).

2. Related Art

There are a variety of proposed optical systems incorporated in a virtual image display apparatus, such as a head mounted display (hereinafter also referred to as HMD) mounted on a viewer's head (see JP-A-2015-72438, for example).

As a virtual image display apparatus of this type, there is a known apparatus that achieves reduction in the size of the apparatus with high precision maintained, for example, by using, as an optical system, a light guide member that has at least two nonaxisymmetric curved surfaces that guide video image light and forms an intermediate image inside (see JP-A-2015-72438).

In the field of an HMD and other similar apparatus, it is required to achieve further size reduction with optical precision maintained, and it is desirable that a light guide member and a projection system that form the optical system of the HMD or any other similar apparatus are so configured that the length of the light guide member in the light guide direction and the overall length of the projection system are further shortened. However, the total reflection condition for guiding video image light in the light guide member, suppression of aberrations, a satisfactory angle of view, a satisfactory eye ring diameter, and a variety of other design conditions restrict the reduction in the size of the optical system, for example, by using the configuration described in JP-A-2015-72438.

SUMMARY

An advantage of some aspects of the invention is to provide a virtual image display apparatus that allows further reduction in the size of an optical system with optical precision maintained and hence reduction in the size of the overall apparatus.

A virtual image display apparatus according to an aspect of the invention includes a video device that generates video image light, a light guide member that guides the video image light from the video device based on total reflection that occurs at a plurality of surfaces including a nonaxisymmetric curved surface and serves as part of an optical system to form an intermediate image in the light guide member, and a projection system that causes the video image light from the video device to enter the light guide member, and assuming that one of in-plane directions in a plane orthogonal to a projection system optical axis of the projection system is called a first direction and a direction that is another one of the in-plane directions and orthogonal to the first direction is called a second direction, the projection system has a stop that forms an opening that is symmetric with respect to a first flat plane including the projection system optical axis and a first axis that extends in parallel to the first direction and intersects the projection system optical axis but asymmetric with respect to a second flat surface including the projection system optical axis and a second axis that extends in parallel to the second direction and intersects the projection system optical axis.

In the virtual image display apparatus described above, the projection system has a stop that forms an opening that is symmetric with respect to the first flat plane including the first axis and the projection system optical axis described above but asymmetric with respect to the second flat plane including the second axis and the projection system optical axis described above, whereby the stop can appropriately adjust light, for example, even when pencils of light from pixels of the video device exit at angles different from one another along the second direction in the projection system. Further, the configuration described above allows the size of the optical system to be further reduced and therefore the size of the overall apparatus to be reduced with a variety of types of optical precision, such as the resolution and angle of view, maintained to be equal to, for example, those disclosed in JP-A-2015-72438.

In a specific aspect of the invention, in the projection system, the stop is so disposed as to be orthogonal to the projection system optical axis, and a shape of the opening is symmetric with respect to the first axis but asymmetric with respect to the second axis. In this case, the shape of the opening allows the stop to perform appropriate light adjustment.

In another aspect of the invention, in the projection system, the stop is so disposed as not to be orthogonal to the projection system optical axis. In this case, the arrangement of the stop allows the stop to perform appropriate light adjustment.

In still another aspect of the invention, the stop is so disposed that the stop orthogonal to the projection system optical axis is rotated around the second axis by a predetermined angle to achieve a non-orthogonal arrangement. In this case, the stop rotated around the second axis by a predetermined angle allows the stop to perform appropriate light adjustment.

Instill another aspect of the invention, the opening of the stop has a quadrangular shape. In this case, the stop allows adjustment of light that is symmetric, for example, in the horizontal direction or the vertical direction.

In still another aspect of the invention, in the projection system, the projection system optical axis is parallel to a direction of a normal to a light exiting plane of the video device and passes through a center of the video device. In this case, the projection system optical axis and the central axis of the video device are allowed to coincide with each other.

In still another aspect of the invention, the video device has a rectangular light exiting plane, and a longitudinal direction and a widthwise direction of the light exiting plane correspond to the first direction and the second direction, respectively. In this case, the stop allows light adjustment corresponding to the rectangular light exiting plane.

In still another aspect of the invention, in the light guide member, a light guide direction is a direction parallel to the first flat plane. In this case, the stop allows light adjustment according to the light guide direction.

In still another aspect of the invention, in the projection system, the stop is provided as part of an inner surface of a lens barrel that fixes a lens group that forms the projection system. In this case, the stop can be manufactured integrally, for example, with the lens barrel.

In still another aspect of the invention, the stop is provided in a position where a cross-sectional area of a pencil of light is minimized in the lens barrel. In this case, the stop allows light adjustment in an efficient, uniform manner.

In still another aspect of the invention, the projection system includes at least one nonaxisymmetric aspheric surface, and the one nonaxisymmetric aspheric surface is located in a position where in a pencil of light of video image light that exits from each of two points in different corner regions of a light exiting plane of the video device, light components that should reach a viewer's eyes do not intersect each other. In this case, the projection system has a nonaxisymmetric aspheric surface in the position described above, whereby the size of the optical system that guides light with an intermediate image formed in the light guide member can be further reduced, and the size of the overall apparatus can therefore be reduced.

In still another aspect of the invention, the video device causes pencils of light to exit from pixels arranged along the first direction at exit angles different from one another along the second direction. In this case, appropriate light blockage can be performed in correspondence with the pencils of light that exit through the shape of the stop.

In still another aspect of the invention, the light guide member has at least two nonaxisymmetric curved surfaces, among the plurality of surfaces that form the light guide member, a first surface and a third surface are so located as to face each other, and the first surface and the third surface provide diopter of roughly zero when an outside scene is visually recognized through the first surface and the third surface, and the video image light from the video device is totally reflected off the third surface, is totally reflected off the first surface, is reflected off a second surface, then passes through the first surface, and reaches an observation side. In this case, the size of the apparatus can be reduced with the state of see-through observation, which allows superposition of an outside scene on an image formed by the video image light and visual recognition of the superimposed image, satisfactorily maintained.

In still another aspect of the invention, an exit angle of a pencil of light of the video image light that exits from the video device is asymmetric with respect to a center of the video device. In this case, the optical path is so adjusted as to be further shortened by the asymmetry of the exit angle of the pencil of light of the video image light exits.

In still another aspect of the invention, curvature of the one nonaxisymmetric aspheric surface, which forms the projection system, in each position where a pencil of light that exits from the video device passes changes in correspondence with an incidence angle of the pencil of light, which exits from the video device, at the nonaxisymmetric curved surface that forms the light guide member.

In still another aspect of the invention, each of the pixels of the video device is so structured as to spread wider in the second direction than in the first direction. In this case, occurrence of luminance unevenness can be suppressed.

In still another aspect of the invention, in a pencil of light that exits from each of the pixels of the video device, a direction of a light beam having highest luminance varies in accordance with a position of the pixel of the video device. In this case, causing the luminance to vary in accordance with the position of a pixel of the video device, that is, adjusting the luminance in advance on the side where the video image light is generated allows occurrence of luminance unevenness to be suppressed when the video image light in the form of video images reaches the eyes.

In still another aspect of the invention, the video device includes a liquid crystal panel, and the interval in a TFT pixel structure differs from the interval in a counter substrate pixel structure having a black matrix structure. In this case, in the space between the TFT pixel structure and the black matrix structure, the range of the light that passes through the space and the angle of the light are adjusted, and luminance unevenness and color unevenness are suppressed in each pixel, whereby a high-quality image can be formed.

In still another aspect of the invention, the video device includes an organic EL panel that has a light emitting layer and a color filter layer, and the interval in the light emitting layer differs from the interval in the color filter layer. In this case, using the organic EL panel allows reduction in size and weight of an apparatus including the video device and highly efficient, high-definition image formation. Further, in this case, in the space between the light emitting layer and the color filter layer, light control on a pixel basis, for example, by adjustment of the arrangement of the color filter layer allows adjustment of the range and angle of the light passing through the space, whereby luminance unevenness and color unevenness can be suppressed for high-quality image formation.

In still another aspect of the invention, the video device includes a deflection member that is disposed in a light exiting section disposed on the light exiting side, and the deflection member changes the angle of the light. In this case, the deflection member can change the angle of the light to suppress luminance unevenness and color unevenness for high-quality image formation.

In still another aspect of the invention, the nonaxisymmetric curved surface of the light guide member is provided at least on a light incident section disposed on a light incident side and a light exiting section disposed on a light exiting side. In this case, the size of the light guide member can be reduced.

In still another aspect of the invention, in the light guide member, the distance from the intersection of the light incident section disposed on the light incident side and the projection system optical axis of the projection system to the intersection of the light exiting section disposed on the light exiting side and a sight line axis assumed to be the reference of the viewer's line of sight is 48 mm or smaller. In this case, from a viewpoint of longtime use of the apparatus used as an HMD, the exterior appearance of the apparatus, and other factors, the size of the apparatus can be sufficiently reduced.

In still another aspect of the invention, the light guide member has a semi-transmissive/reflective section that partially reflects and transmits the video image light from the video device and outside light, and the light guide member is connected to a light transmissive member via the semi-transmissive/reflective section. In this case, the light guide member cooperates with the light transmissive member to form a structure in which the light guide member and the light transmissive member sandwich the semi-transmissive/reflective section, whereby the viewer is allowed to not only visually recognize the video image light but also visually recognize or view an outside image in a see-through observation.

In still another aspect of the invention, the light guide member is formed of a pair of right and left light guide members, and the pair of right and left light guide members and the light transmissive member are so configured that the pair of right and left light guide members sandwich the light transmissive member and are connected each other via the light transmissive member to form a unitary optical member. In this case, image recognition in binocular vision is allowed, and the light transmissive member allows the positioning for the binocular vision to be readily and precisely performed.

BRIEF DESCRIPTION OF THE DRAWINGS

The invention will be described with reference to the accompanying drawings, wherein like numbers reference like elements.

FIG. 10A is a conceptual plan view for describing a variation of the light guide apparatus, and FIG. 10B is a front view of the light guide apparatus.

FIGS. 13A to 13C describe another variation of the stop in the projection system, and FIGS. 13D and 13E describe still other variations of the stop.

DESCRIPTION OF EXEMPLARY EMBODIMENTS

A virtual image display apparatus according to an embodiment of the invention will be described below in detail with reference to FIG. 1 and other figures.

Figure 1:
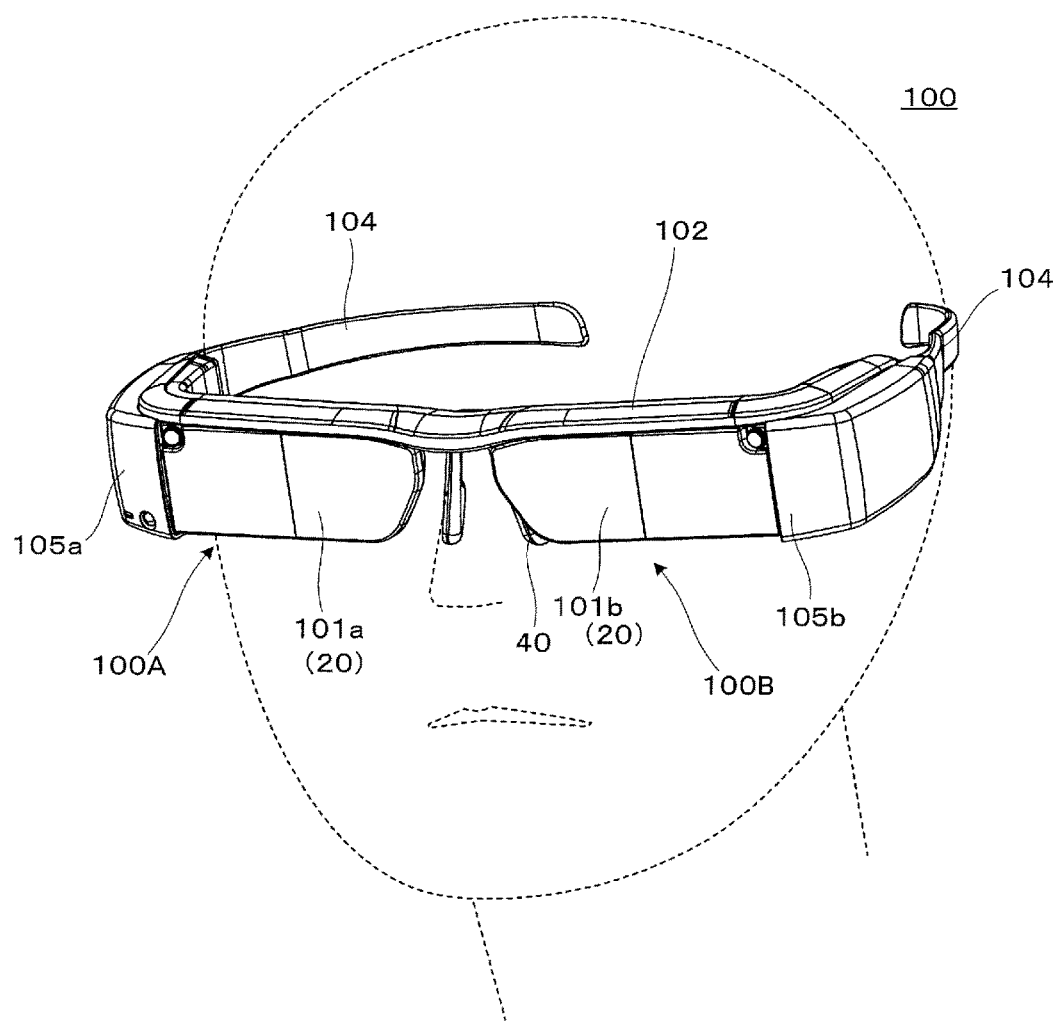
FIG. 1 is a perspective view for briefly describing the exterior appearance of an example of a virtual image display apparatus according to an embodiment.
Figure 2:
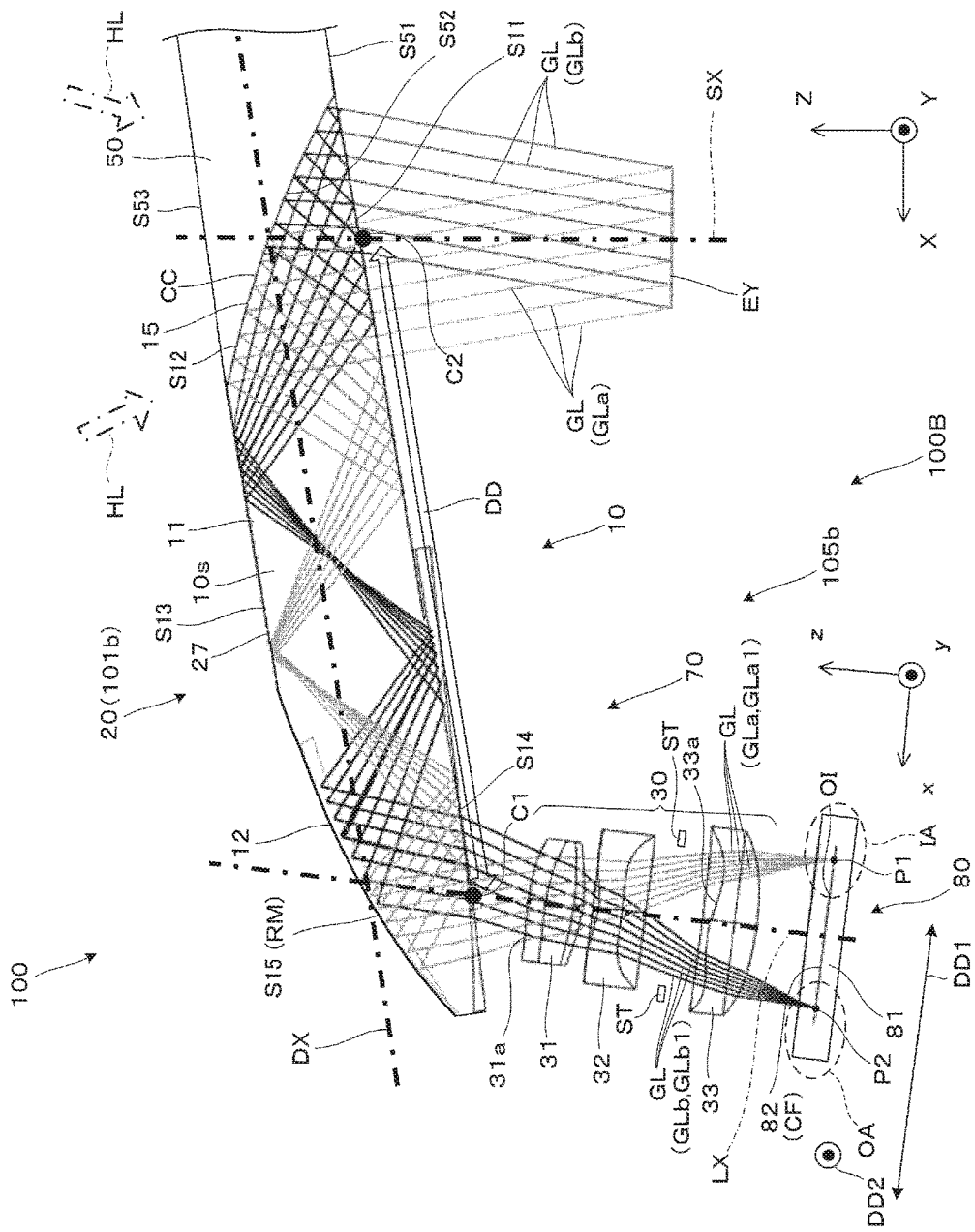
FIG. 2 is a plan view showing the optical path in a main body portion that forms the virtual image display apparatus.

A virtual image display apparatus 100 according to the present embodiment is not only a head mounted display having a glasses-like exterior appearance, as shown in FIG. 1, but also a virtual image display apparatus that allows a viewer or a user on whom the virtual image display apparatus 100 is mounted to visually recognize image light (video image light) in the form of a virtual image and further allows the viewer to visually recognize or view an outside image in see-through observation. The virtual image display apparatus 100 includes first and second optical members 101a, 101b, which cover the front side of the viewer's eyes but allow see-through observation, a frame section 102, which supports the two optical members 101a and 101b, and first and second image formation main body sections 105a, 105b, which are added to portions extending from the right and left ends of the frame section 102 to rear bow portions (temples) 104. A first display apparatus 100A, which is the combination of the first optical member 101a and the first image formation main body section 105a on the left in FIG. 1, is a portion that forms a virtual image for the right eye, and the first display apparatus 100A functions as a virtual image display apparatus by itself. Similarly, a second display apparatus 100B, which is the combination of the second optical member 101b and the second image formation main body section 105b on the right in FIG. 1, is a portion that forms a virtual image for the left eye, and the second display apparatus 100B functions as a virtual image display apparatus by itself. Comparison of FIG. 2 with FIG. 1 shows, for example, that each of the first and second image formation main body sections 105a, 105b is formed of a projection lens 30, which is a projection system, and an image display apparatus 80 (video device), which includes an image generator 81. FIG. 2 shows the display apparatus for the left eye but does not show the display apparatus for the right eye, which has the same structure as that of the display apparatus for the left eye. In addition to the components described above, a nose receiver 40, which comes into contact with the viewer's nose and therefore plays a role in supporting the frame section 102, is provided.

The display apparatus 100B can be considered to include a projection/see-through apparatus 70, which is an optical system for projection, and the image display apparatus 80, which forms video image light, as shown in FIG. 2. The projection/see-through apparatus 70 includes the second optical member 101b or a light guide apparatus 20 and the projection lens 30 for image formation and plays a role in projecting an image formed by the image display apparatus 80 in the form of a virtual image onto the viewer's eye. In other words, the projection/see-through apparatus 70 is not only a virtual image optical system that guides light from an image plane OI, which is a plane from which image light (video image light) formed by the image display apparatus 80 exits, to allow the viewer to visually recognize a virtual image but also an image formation optical system that performs image reformation on the viewer's retina. The second optical member 101b or the light guide apparatus 20 is formed of a light guide member 10 for light guide operation and see-through operation and a light transmissive member 50 for see-through operation. The second image formation main body section 105b is formed of the image display apparatus 80 and the projection lens 30. The image plane OI is also a panel plane representing the position of a panel that forms the image display apparatus 80. Further, in a case where the image display apparatus 80 is a self-luminous illuminator, it can also be said that the image plane OI is a light emitting plane.

The optical system described above has several optical axes, and the reference of each of the optical axes is defined as follows: First, the central optical axis of the projection lens 30 is called a lens optical axis (projection system optical axis) LX; a central axis that extends along the light guide direction of the light guide member 10 is called a light guide axis DX, and the light guide axis DX is an axis that passes through the center of the light guide member 10, which has a flat-plate shape, and extends along the flat-plate shape; and a central axis that is set on the light exiting side of the light guide member 10 and assumed to be the reference of the viewer's line of sight is called a sight line axis SX. The sight line axis SX is an axis extending from the center position of an assumed eye position EY, which is assumed to be the eye position, (hereinafter also simply described as an eye EY to include a case where an eye is actually located in the assumed eye position EY) toward the center of a light exiting segment of the light guide member 10. Further, the intersection of a light incident section (second light guide section 12, which will be described later) disposed on the light incident side of the light guide member 10 and the lens optical axis LX of the projection lens 30 is called an intersection C1, and the intersection of a light exiting section (first light guide section 11, which will be described later) disposed on the light exiting side of the light guide member 10 and the sight line axis SX is called an intersection C2. The distance (spacing) indicated by the bidirectional arrow AA in FIG. 2 from the intersection C1 to the intersection C2 is assumed to be 48 mm or smaller. The sight line axis SX inclines with respect to the lens optical axis LX by about 7° (more accurately, 6.7°). The sight line axis SX further inclines by about 10° with respect to a normal to the light guide axis DX. That is, the sight line axis SX and the light guide axis DX intersect each other and form an angle of reflection of about 80°. As a result, in the case described above, the lens optical axis LX and the light guide axis DX intersect each other and form an angle of reflection of about 106.7°.

Figure 3:
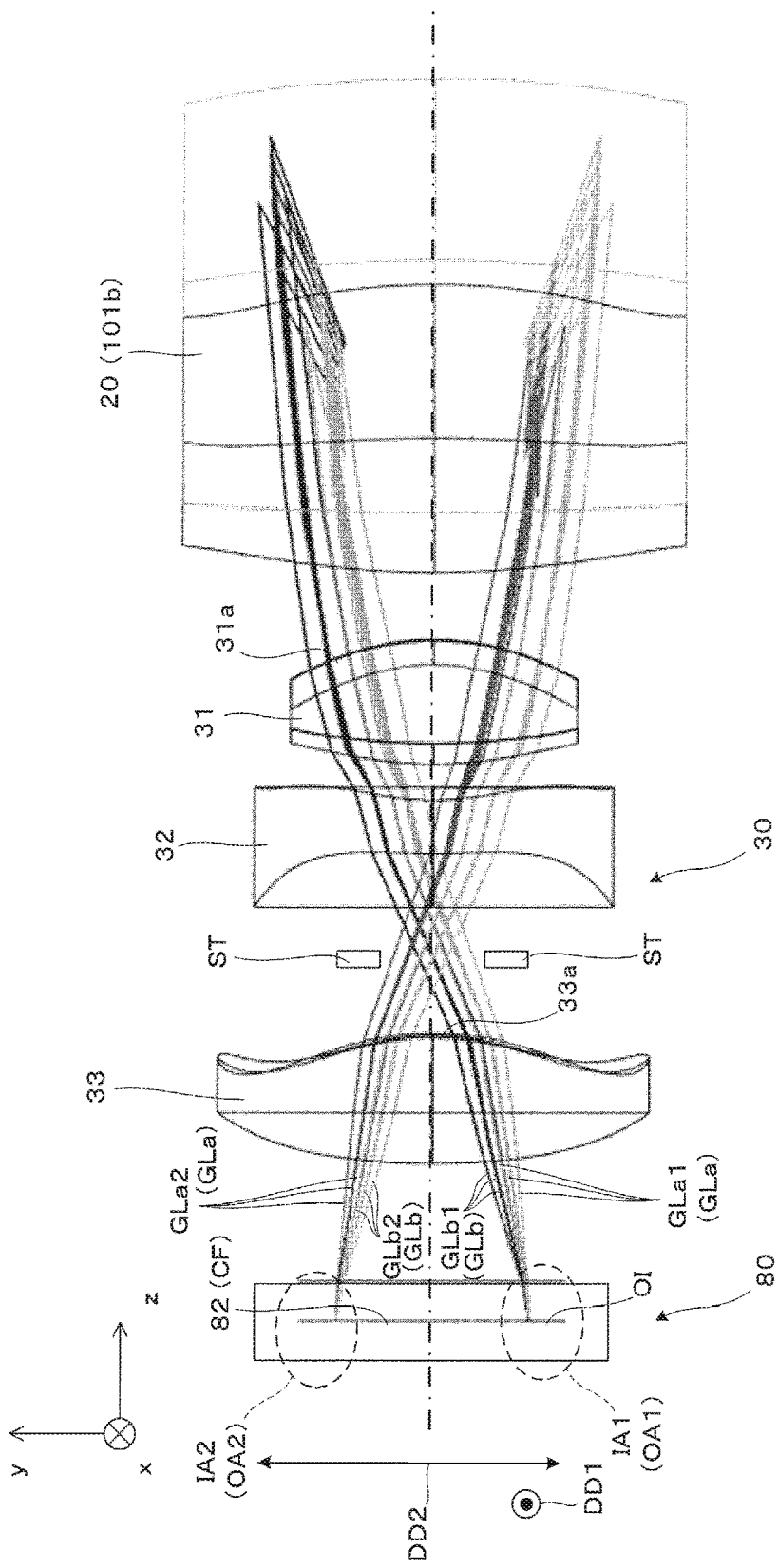
FIG. 3 is a side view showing the optical path in the main body portion that forms the virtual image display apparatus.
Figure 4:
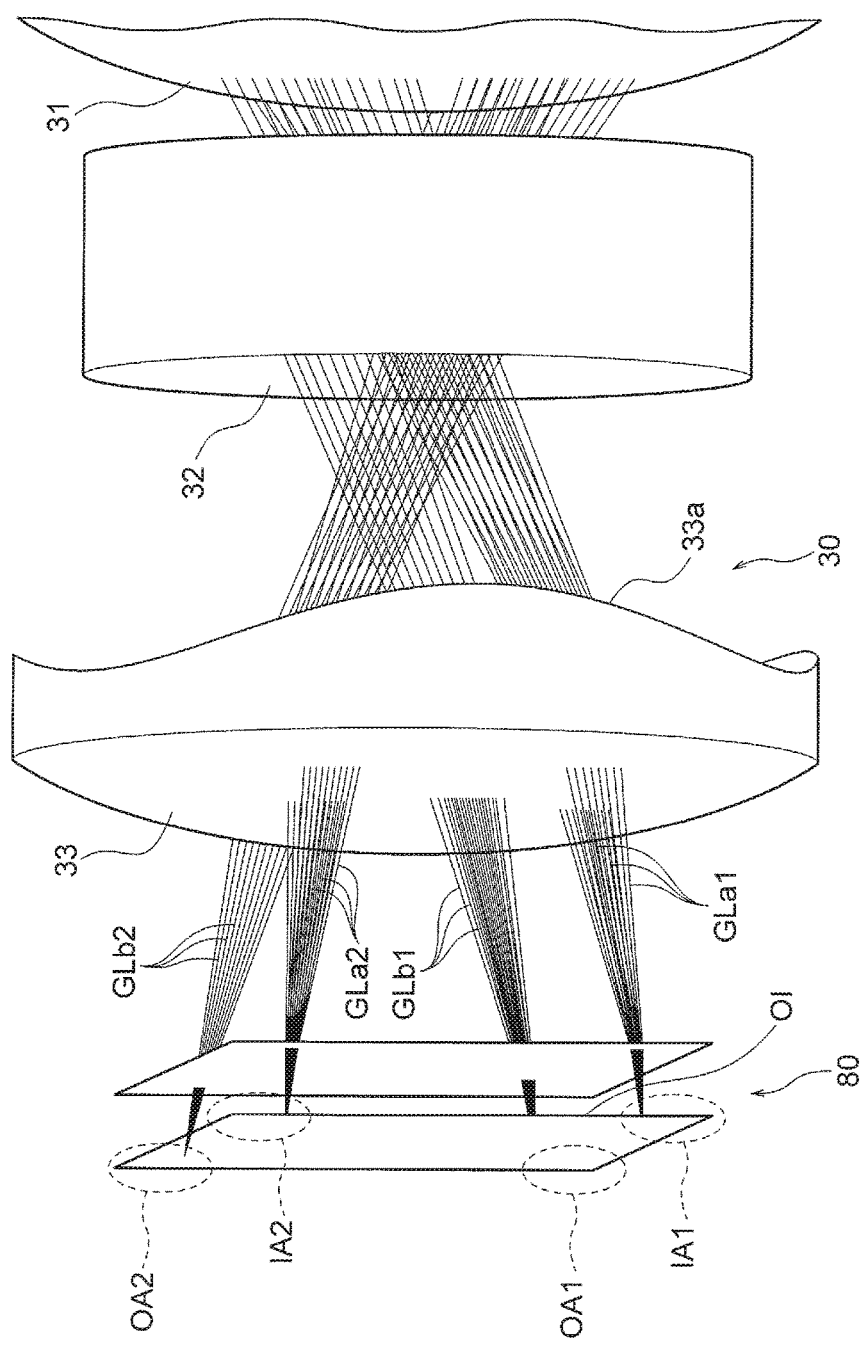
FIG. 4 is a perspective view showing the optical path of a projection system.

In the image display apparatus 80, the image plane OI is a rectangular light exiting plane orthogonal to the lens optical axis LX, and the lens optical axis LX passes through the center of the image plane OI. That is, in this example, the lens optical axis (projection system optical axis) LX is parallel to the direction of a normal to the image plane OI, which is the light exiting plane of the image display apparatus 80, and passes through the center of the image display apparatus 80, which means that the lens optical axis LX coincides with the central axis of the image display apparatus 80. It is now assumed that an x direction (direction corresponding to X direction), which is the horizontal direction in a plane parallel to the image plane OI, is called a first direction DD1, and that a y direction (direction corresponding to Y direction), which is the vertical direction in the plane parallel to the image plane OI, is called a second direction DD2. In the image plane OI, it is assumed that the first direction DD1 is the longitudinal direction and the second direction DD2 is the widthwise direction. A z direction is the direction of a normal to the image plane OI and the direction in which the lens optical axis LX extends. Under the definition described above, the first direction DD1 and the second direction DD2 also represent in-plane directions in a plane (xy plane) orthogonal to the lens optical axis LX, and it can be considered that one of the in-plane directions is the first direction DD1 and that the second direction DD2 is the direction that is the other one of the in-plane directions and orthogonal to the first direction DD1. In the present embodiment, the exit angles of pencils of light of the video image light that exits from the image plane OI are asymmetric with respect to the center line of the image plane OI (lens optical axis LX) in the rightward/leftward direction (x direction), as shown in FIGS. 2 to 4. The exit angles are symmetric with respect to the center of the image plane OI in the upward/downward direction (y direction) (see FIG. 3).

Referring back to FIG. 2, the image display apparatus 80 includes an image generator 81, which forms the image plane OI that is formed of pixels arranged in a matrix and serves as a self-luminous illuminator including an organic EL light source (organic EL panel), a light orientation controller 82, which is disposed in a position immediately downstream of the image generator 81 and controls the orientation of each light component of video image light GL that exits from the image plane OI of the image generator 81, and a drive controller (not shown) that controls the action of the image generator 81 and other components. Although will be described later in detail (see FIGS. 7A and 7B and other figures), in the embodiment, a color filter layer CF, which is disposed in a position immediately downstream of the image generator 81, functions as the light orientation controller 82 to adjust the exit angles of the light components of the video image light GL that exit from the periphery of the image plane OI. For example, among sub-pencils of light of the video image light GL, a sub-pencil of light GLa, which exits from an inner portion of the image plane OI or a portion thereof relatively close to the viewer's body (viewer), and a sub-pencil of light GLb, which exits from an outer portion of the image plane OI or a portion thereof relatively far away from the viewer's body, exit at different exit angles. It is assumed that in the pencil of light that forms the video image light GL, the sub-pencils of light GLa and GLb mean light components that should reach the viewer's eye.

The projection lens 30 is a projection system that projects the video image light GL having exited from the image display apparatus 80 toward the light guide apparatus 20. In the present embodiment, in particular, a lens having an aspheric surface having a nonaxisymmetric shape (nonaxisymmetric aspheric surface or free-form surface) is disposed on the side close to the image display apparatus 80 to allow reduction in the size of the overall optical system. The projection lens 30 is accompanied by a stop ST. The stop ST, which forms a non-line-symmetric rectangular opening by way of example, appropriately blocks light components of the video image light GL that asymmetrically exit as described above, such as the pencil of light GLa. The shape, structure, and other factors of the stop ST will be described later in detail with reference to FIGS. 5A and 5B and other figures.

The light guide apparatus 20 is formed of the light guide member 10 for light guide operation and see-through operation and the light transmissive member 50 for see-through operation, as described above. The light guide member 10 is part of the prism-shaped light guide apparatus 20 and is a member integrated therewith, but can be considered as the combination of a first light guide section 11 (light exiting section) on the light exiting side and a second light guide section 12 (light incident section) on the light incident side. The light transmissive member 50 is a member that assists the light guide member 10 in performing the see-through function (assistant optical block) and is integrated with and fixed to the light guide member 10 to form the single light guide apparatus 20.

The role of the projection/see-through apparatus 70, which is a virtual image optical system, that is, the light guide apparatus 20 and the projection lens 30 will be described below in detail with reference to FIG. 2.

The projection lens 30 is an optical system that allows the video image light GL to be incident from the image display apparatus 80 and projects the video image light GL and is a projection system including, as constituent elements, three optical elements (first to third lenses) 31 to 33 along the lens optical axis LX, which is the projection system optical axis. The optical elements 31 to 33 are each formed of an aspheric lens having an aspheric surface having a nonaxisymmetric shape (nonaxisymmetric aspheric surface) and an aspheric surface having an axisymmetric shape (axisymmetric aspheric surface) and cooperate with part of the light guide member 10 to form, in the light guide member 10, an intermediate image corresponding to an image displayed in the image generator 81. In the present embodiment, in particular, not only is a light-exiting-side lens surface 31a of the lens surfaces of the first lens 31, which is disposed on the light exiting side, a nonaxisymmetric aspheric surface but also a light-exiting-side lens surface 33a of the lens surfaces of the third lens 33, which is disposed on the light incident side, is a nonaxisymmetric aspheric surface. The first to third lenses 31 to 33, which form the projection lens 30, are accommodated in and supported by the second image formation main body section 105b, for example, via a lens barrel (see FIGS. 5A and 5B). The projection lens 30 further has the stop ST between the second lens 32 and the third lens 33 out of the first to third lenses 31 to 33. In the projection lens 30, the stop ST is disposed at a location where the largest number of pencil of lights of the video image light GL are superimposed on one another so that the light is appropriately narrowed down. The location where the largest number of pencil of lights of the video image light GL are superimposed on one another is, for example, the exit pupil of the projection lens 30 and therearound. From a different point of view, it can be said that placing the stop ST at the location described above is equivalent to providing a member that appropriately functions as the stop ST, for example, with no increase in the size of a lens barrel 39 (see FIGS. 5A and 5B), which accommodates the first to third lenses 31 to 33. Further, since the lens surfaces in the configuration include nonaxisymmetric aspheric surfaces, the light components of the pencils of light are deflected in a complicated manner. The stop ST has a shape and a structure corresponding to the complicated deflection behavior.

The light guide apparatus 20 is formed of the light guide member 10 and the light transmissive member 50, as described above. Out of the two members, the light guide member 10 has a central side (side in front of eye) that is close to the nose and linearly extends in a plan view. In the light guide member 10, the first light guide section 11, which is disposed on the central side close to the nose, that is, on the light exiting side, has a first surface S11, a second surface S12, and a third surface S13 as side surfaces having optical functions, and the second light guide section 12, which is disposed on the peripheral side separate away from the nose, that is, on the light incident side, has a fourth surface S14 and a fifth surface S15 as side surfaces having optical functions. Among the surfaces described above, the first surface S11 and the fourth surface S14 are continuously adjacent to each other, and the third surface S13 and the fifth surface S15 are continuously adjacent to each other. The second surface S12 is located between the first surface S11 and the third surface S13, and the fourth surface S14 and the fifth surface S15 are adjacent to each other with a large angle therebetween. Further, in the embodiment, the first surface S11 and the third surface S13, which face each other, have planar shapes roughly parallel to each other. On the other hand, the other surfaces having optical functions, that is, the second surface S12, the fourth surface S14, and the fifth surface S15 are each a nonaxisymmetric curved surface (free-form surface).

The light transmissive member 50 is integrated with and fixed to the light guide member 10 to form the single light guide apparatus 20 and is a member that assists the light guide member 10 in performing the see-through function (assistant optical block), as described above. The light transmissive member 50 has a first transmissive surface S51, a second transmissive surface S52, and a third transmissive surface S53 as side surfaces having optical functions. The second transmissive surface S52 is located between the first transmissive surface S51 and the third transmissive surface S53. The first transmissive surface S51 is a surface that forms an extension of the first surface S11 of the light guide member 10. The second transmissive surface S52 is a curved surface bonded to and integrated with the second surface S12 via an adhesive layer CC. The third transmissive surface S53 is a surface that forms an extension of the third surface S13 of the light guide member 10. Among the surfaces described above, since the second transmissive surface S52 and the second surface S12 of the light guide member 10 are bonded to and integrated with each other via the thin adhesive layer CC, the two surfaces have shapes having roughly the same curvature.

Among the plurality of surfaces that form the light guide member 10, at least one of the surfaces S14 and S15, which are the surfaces other than the first surface S11 to the third surface S13 and free-form surfaces, has at least one point where the sign of curvature varies in accordance with the direction. The thus formed free-form surface allows reduction in the size of the light guide member 10 while the guidance of the video image light being precisely controlled.

A main body 10s of the light guide member 10 has high light transmittance in the visible wavelength region and is a unitary part, but the light guide member 10 can be considered as the combination of the first light guide section 11 and the second light guide section 12 in a functional sense, as described above. The first light guide section 11 not only allows the video image light GL to be guided through the light guide member 10 and exit out thereof but also allows see-through observation of outside light HL. The second light guide section 12 allows the video image light GL to enter the light guide member 10 and guided therethrough.

In the first light guide section 11, the first surface S11 functions as a refraction surface that causes the video image light GL to exit out of the first light guide section 11 and further functions as a total reflection surface the inner side of which totally reflects the video image light GL. The first surface S11 is located in front of the assumed eye position EY (eye EY) and has a planar shape, as described above. The first surface S11 is a surface formed by a hard coat layer 27 coated on the surface of the main body 10s.

The second surface S12 is accompanied by a half-silvered mirror layer 15, which is formed on a surface of the main body 10s, and functions as a semi-transmissive/reflective surface (semi-transmissive/reflective section) that reflects the video image light GL but transmits the outside light HL.

The third surface S13 functions as a total reflection surface the inner side of which totally reflects the video image light GL. The third surface S13 is located roughly in front of the eye EY and has a planar shape, as the first surface S11 does. Since the first surface S11 and the third surface S13 are surfaces parallel to each other, when the viewer views the outside light HL through the first surface S11 and the third surface S13, the diopter provided by the two surfaces is zero, and no particular change in magnification occurs. The third surface S13 is a surface formed by the hard coat layer 27 coated on the surface of the main body 10s.

In the second light guide section 12, the fourth surface S14 functions as a total reflection surface the inner side of which totally reflects the video image light GL. The fourth surface S14 further functions as a refraction surface that causes the video image light GL to enter the second light guide section 12. That is, the fourth surface S14 has both the function as the light incident surface that allows the video image light GL to externally enter the light guide member 10 and the function as the light reflection surface that causes the video image light GL to propagate in the light guide member 10. The fourth surface S14 is a surface formed by the hard coat layer 27 coated on the surface of the main body 10s.

In the second light guide section 12, the fifth surface S15 is formed by deposition of a light reflection film RM made of an inorganic material on a surface of the main body 10s and functions as a reflection surface.

The light transmissive member 50 has high light transmittance in the visible wavelength region, and a main body portion of the light transmissive member 50 is made of a material having a refractive index roughly equal to the refractive index of the main body 10s of the light guide member 10. The light transmissive member 50 is formed by bonding the main body portion to the main body 10s of the light guide member 10 and then depositing a hard coat on the main body portion along with the main body 10s bonded thereto. That is, the light transmissive member 50 has the hard coat layer 27 provided on the surface of the main body portion, as the light guide member 10 does. Each of the first transmissive surface S51 and the third transmissive surface S53 is a surface formed by the hard coat layer 27 coated on the surface of the main body portion.

The light guide apparatus 20 is formed by bonding the base members that eventually form the light guide member 10 and the light transmissive member 50 to each other and then depositing a coating on the bonded base members in a dip process. That is, the hard coat layer 27 on the light guide member 10 is provided over the entire light guide apparatus 20 along with the light transmissive member 50.

As described above, the video image light from the image generator 81 is guided through the light guide member 10 while reflected five times off the first surface S11 to the fifth surface S15 including total reflection at least twice. The light guide operation described above not only allows display of the video image light GL and visual recognition of outside light HL in see-through observation at the same time but also allows correction of aberrations of the video image light GL.

The optical paths of the video image light GL and other types of light in the virtual image display apparatus 100 will be described below. The video image light GL having exited from the image display apparatus 80 passes through the lenses 31 to 33, which form the projection lens 30 and through which the video image light GL converges and receives intended astigmatism, and is incident on the fourth surface S14, which is a surface of the light guide member 10 and has positive refractive power. The astigmatism is canceled out when the video image light GL travels via the surfaces of the light guide member 10, and video image light having an intended state eventually exits toward the viewer's eye.

The video image light GL having been incident on and passed through the fourth surface S14 of the light guide member 10 travels while converging, and when the video image light GL travels through the second light guide section 12, the video image light GL is reflected off the fifth surface S15, which has relatively small positive refractive power, and is incident on the inner side of the fourth surface S14 again and reflected off the fourth surface S14.

The video image light GL reflected off the fourth surface S14 of the second light guide section 12 enters the first light guide section 11, where the video image light GL is incident on and totally reflected off the third surface S13, which has substantially no refractive power, and is incident on and totally reflected off the first surface S11, which has substantially no refractive power.

In this process, the video image light GL forms an intermediate image in the light guide member 10 before or after the video image light GL travels via the third surface S13. The image plane of the intermediate image corresponds to the image plane OI of the image generator 81.

The video image light GL totally reflected off the first surface S11 is incident on the second surface S12 while diverging. In particular, the video image light GL incident on the half-silvered mirror layer 15 is partially reflected off the half-silvered mirror layer 15, with part of the video image light GL passing therethrough, and is incident on the first surface S11 again and passes therethrough. The half-silvered mirror layer 15 acts as an optical element having relatively large positive refractive power and affects the video image light GL reflected off the half-silvered mirror layer 15 accordingly. On the other hand, the first surface S11 acts as an optical element having no refractive power and affects the video image light GL passing through the first surface S11 accordingly.

The video image light GL having passed through the first surface S11 is incident in the form of a roughly parallelized luminous flux on the pupil of the viewer's eye EY or the position equivalent thereto. That is, the video image light GL in the form of a virtual image allows the viewer to view the image formed on the image generator 81.

On the other hand, the outside light HL incident on the light guide member 10 and in a portion on the +X side of the second surface S12 passes through the third surface S13 and the first surface S11 of the first light guide section 11. In this process, aberrations and other disadvantageous effects hardly occur because the third surface S13 and the first surface S11 are flat surfaces roughly parallel to each other. That is, the viewer views a distortion-free outside image through the light guide member 10. Similarly, the outside light HL incident on the light guide member 10 and in a portion on the −X side of the second surface S12, that is, the outside light HL incident on the light transmissive member 50 passes through the third transmissive surface S53 and the first transmissive surface S51 of the light transmissive member 50, and no aberrations or other disadvantageous effects occur because the third transmissive surface S53 and the first transmissive surface S51 are flat surfaces roughly parallel to each other. That is, the viewer views a distortion-free outside image through the light transmissive member 50. Further, the outside light HL incident on the light transmissive member 50 corresponding to the second surface S12 of the light guide member 10 passes through the third transmissive surface S53 and the first surface S11, and aberrations and other disadvantageous effects hardly occur because the third transmissive surface S53 and the first surface S11 are flat surfaces roughly parallel to each other. That is, the viewer views an outside image with a small amount of distortion through the light transmissive member 50. The second surface S12 of the light guide member 10 and the second transmissive surface S52 of the light transmissive member 50 have roughly the same curved shape and roughly the same refractive index, and the gap between the second surface S12 and the second transmissive surface S52 is filled with the adhesive layer CC having a refractive index that is roughly the same as the refractive indices of the two surfaces. That is, the second surface S12 of the light guide member 10 or the second transmissive surface S52 of the light transmissive member 50 does not act as a refractive surface that affects the outside light HL.

In an optical system of related art in which an intermediate image is formed and total reflection in a light guide member is used to guide light, such as the optical system described above, to maintain high precision while attempting reduction in the size of an apparatus in which the optical system is incorporated, a free-curved form surface is used in the light guide member or any other optical element to adjust the optical path with aberrations suppressed. For example, in JP-A-2015-72438, the requirement of size reduction is satisfied with aberrations corrected by providing not only the light guide member but also part of a projection lens (light-exiting-side lens surface) with free-curved form surfaces. However, for example, since the total reflection condition needs to be maintained to guide light in the light guide member and other constraints are imposed, the size reduction is limited from a design point of view. Specifically, for example, in a case where the distance from the intersection C1 to the intersection C2 in the light guide apparatus 20 shown in FIG. 2 is desired to be shortened, that is, the length of the light guide apparatus 20 in the light guide direction is desired to be shortened, the condition under which the video image light is totally reflected tends to be a bottleneck. In this case, if the lens surface 33a is not formed of a nonaxisymmetric aspheric surface unlike in the present application, it is possibly particularly difficult to control the sub-pencil of light GLa, which is a light component that exits from an inner portion of the image display apparatus 80 or a portion thereof close to the viewer's body, in such a way that the sub-pencil of light GLa satisfies the total reflection condition on the surfaces S11, S13 and S14. For example, it is conceivable to adjust the shape of a portion which forms the surface S12 and is close to the surface S13 and via which light components that are particularly unlikely to satisfy the total reflection condition travel in such a way that the sub-pencil of light GLa satisfies the total reflection condition. In the adjustment, however, not only does the portion that forms the surface S12 and is close to the surface S13 need to be adjusted, but also a portion of the surface S12 which extends from the portion thereof close to the surface S13 to a central side thereof and which forms the entire segment via which the sub-pencil of light GLa travels needs to be entirely adjusted. In this case, part of the adjusted portion (portion of surface S12 that is close to center thereof), which is also a segment via which the sub-pencil of light GLb travels, which is a light component that exits from an outer portion of the image display apparatus 80 or a portion thereof separate away from the viewer's body, is subject to a variety of constraints in the adjustment of the shape of the surface S12, resulting in a difficulty in aberration correction in the optical system as a whole. Further, as another candidate of the portion to be adjusted, for example, it is conceivable to adjust the surface S14, which is a nonaxisymmetric aspheric surface and where the sub-pencil of light GLa and the sub-pencil of light GLb are reflected off in regions separate from each other. The surface S14 is, however, a portion that not only reflects the video image light GL but also transmits the video image light GL, and, for example, the region where the sub-pencil of light GLa is reflected overlaps with the region where the sub-pencil of light GLb passes. A variety of constraints are therefore imposed also in the adjustment of the surface S14.

In contrast, in the present embodiment, in particular, not only is the lens surface 31a of the first lens disposed on the light exiting side a nonaxisymmetric aspheric surface, but also the light-exiting-side lens surface 33a of the third lens 33 disposed on the light incident side is a nonaxisymmetric aspheric surface. The lens surface 33a is a lens surface that is one of the lens surfaces of the projection lens 30 and located in a position relatively close to the image display apparatus 80. Therefore, among peripheral regions (called corner regions) of the image plane OI, the sub-pencils of light GLa and GLb, which exit from two points P1 and P2 in inner and outer corner regions IA and OA different from each other, pass through the lens surface 33a before they intersect each other, as shown, for example, in FIG. 2. That is, in the case described above, the lens surface 33a, which is a nonaxisymmetric aspheric surface, is located in a position where the sub-pencils of light GLa and GLb, which are light components that should reach the viewer's eye among the pencils of light of the video image light that exit from the two points P1 and P2 in the different corner regions of the image plane OI, which is the light exiting plane of the image display apparatus 80, do not intersect each other. When the thus located lens surface 33a is a nonaxisymmetric aspheric surface (free-form surface), the lens surface 33a separately affects the sub-pencil of light GLa, which exits from an inner region of the image plane OI or a region thereof close to the viewer's body, and the sub-pencil of light GLb, which exits from an outer region of the image plane OI or a region separate away from the viewer's body. That is, for example, aberration correction performed on the sub-pencil of light GLa and aberration correction performed on the sub-pencil of light GLb can be separately performed. Further, the stop ST, which is provided in the projection lens 30, has a shape asymmetrically deformed in accordance with the difference in the situation in which a sub-pencil of light exits among the sub-pencils of light, such as the sub-pencils of light GLa and GLb, whereby light components that pass through the stop ST can be appropriately blocked.

As comparison purposes, for example, consider the lens surface 31a. In the position of the lens surface 31a, since the segment where the sub-pencil of light GLa passes and the segment where the sub-pencil of light GLb passes overlap with each other, the sub-pencil of light GLa and the sub-pencil of light GLb cannot be separated from each other for separate aberration correction, but only correction of aberrations of the pencil of light as a whole can be performed. In the present embodiment, in which a nonaxisymmetric aspheric surface (lens surface 33a) is located in a position where the light components that should reach the viewer's eye (sub-pencils of light GLa and GLb) in the pencil of light of the video image light do not intersect each other, the size of the optical system can be further reduced and hence the size of the entire apparatus can be reduced with a variety of types of optical precision, such as the resolution and the angle of view, maintained to be equal to those of the virtual image display apparatus disclosed, for example, in JP-A-2015-72438. Specifically, in the light guide apparatus 20, for example, the distance (spacing) from the intersection C1 to the intersection C2 can be set at 48 mm or smaller, as described above. In the optical system thus reduced in size, which has a short light guide range, measures against a problem of occurrence of ghost light due to contamination of the guided light with other light can be particularly important. In the present embodiment, measures against occurrence of ghost light in the light guide member 10 can be taken, as described above. The distance (spacing) between the intersection C1 and the intersection C2 is not necessarily set at 48 mm or smaller and may be set, for example, at 51 mm or smaller. More specifically, it is conceivable to set the distance, for example, at about 50.1 mm. In the case where the distance (spacing) between the intersection C1 and the intersection C2 is set at 51 mm or smaller, an HMD that can be mounted on the viewer who already wears glasses can, for example, be provided.

Further, in this case, the overall length of the projection lens 30 can be shorter than that in related art, and the lens thickness of each of the lenses 31 to 33 can be reduced. As a result, further size reduction can be achieved, whereby a more stylish exterior appearance in an aesthetic sense can be achieved.

Further, in the present embodiment, the sight line axis SX is inclined with respect to the lens optical axis LX by 6.7° and inclined with respect to a normal to the light guide axis DX by about 10°, as described above. Also in this regard, the exterior appearance shape is made more stylish.

Further, in the present embodiment, the projection lens 30 is configured to be a complicated off-axis optical system, and the lenses that form the projection lens 30 are arranged in a relatively packed manner, as described above. Moreover, the light that exits from the image display apparatus 80 is adjusted in correspondence to the configuration of the projection lens 30 and the arrangement of the lenses thereof. That is, the exit angles of the sub-pencils of light that exit from the image plane OI, which is the light exiting plane of the image display apparatus 80, are asymmetric with respect to the lens optical axis LX, which represents the center of the image display apparatus 80.

The exit angles of the sub-pencils of light that form the video image light GL will be more specifically described below with reference to FIGS. 3 and 4. First, consider sub-pencils of light GLa1, GLa2, GLb1, and GLb2, which exit from lower right (inner), upper right (inner), lower left (outer), and upper left (outer) four corners (corner regions IA1, IA2, OA1, and OA2) of the rectangular region of the image display apparatus 80, respectively, and FIGS. 3 and 4 show that the exit angles of the sub-pencils of light GLb1 and GLb2, which exit from the outer regions, are greater than the exit angles of the sub-pencils of light GLa1 and GLa2, which exit from the inner regions (asymmetry in rightward/leftward direction). Therefore, even in the case where the projection lens 30 and other components are formed of the complicatedly shaped optical system described above, luminance unevenness and other disadvantageous phenomena in visually recognized video images can be suppressed. On the other hand, FIGS. 3 and 4 show that the exit angles are equal to each other between the inner regions or the outer regions (symmetry in upward/downward direction). The sub-pencils of light GLa1, GLa2, GLb1, and GLb2 do not intersect one another at the lens surface 33a.

The above discussion will be reviewed from the viewpoint of the first direction DD1 and the second direction DD2. Consider the sub-pencils of light that form the video image light GL in a plane (xy plane) parallel to the image plane OI of the image display apparatus 80. The pencils of light that exit from the pixels arranged in the first direction DD1, which is the x direction (horizontal direction), exit at different exit angles along the second direction DD2, which is the y direction (vertical direction). Further, in the present embodiment, the curvature of the lens surface 33a of the projection lens 30 is changed in accordance with the position where each sub-pencil of light that exits from the image display apparatus 80 passes. Further, the curvature of the lens surface 33a is changed in correspondence with the incidence angles of the sub-pencils of light (sub-pencil of light GLa and sub-pencil of light GLb in FIG. 2, for example) at the surface S12 of the light guide member 10.

In the configuration of the present embodiment, as apparent, for example, from the relationship between the sub-pencil of light GLa and the sub-pencil of light GLb described above, since the exiting pencil of light is not symmetric as a whole, a typical symmetrically shaped, symmetrically arranged stop does not always achieve a desired function of stopping light down, but ghost light or other undesired light may not be sufficiently removed. In contrast, in the present embodiment, forming the stop ST provided in the projection lens 30 in an asymmetric shape corresponding to the light components of the video image light GL allows reliable removal of excess light, whereby high-performance image formation is achieved.

Figures 5A, 5B:
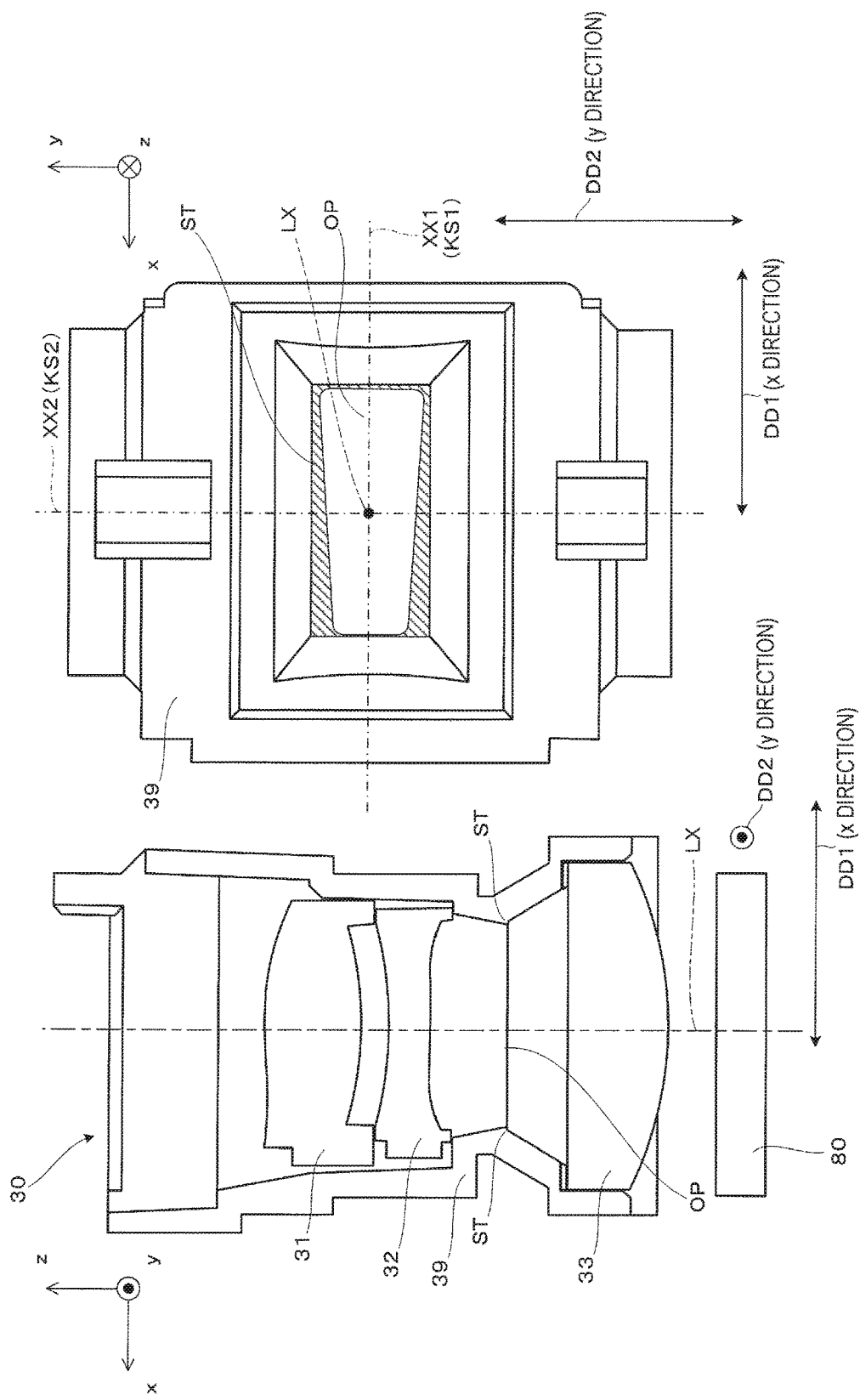
FIG. 5A is a cross-sectional view showing the configuration of the projection system.
FIG. 5B is a front view of a lens barrel in the projection system.
Figure 6A:
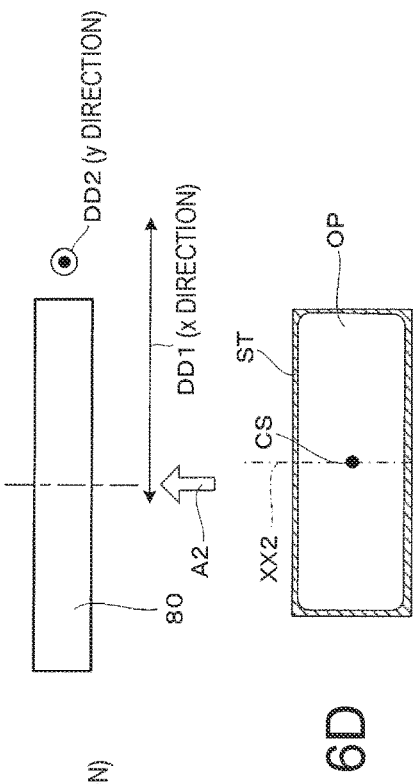
FIG. 6A conceptually shows an example of the arrangement of a video device and a stop in the projection system.
Figure 6B:
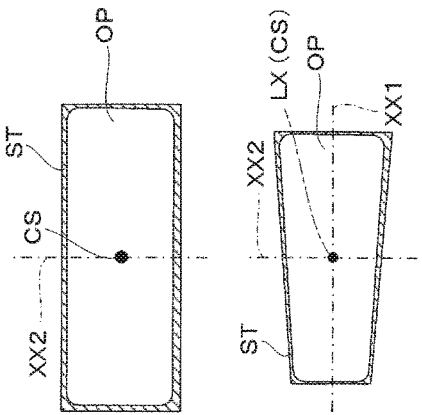
FIG. 6B conceptually shows a variation of the arrangement of the video device and the stop in the projection system.
Figure 6C:
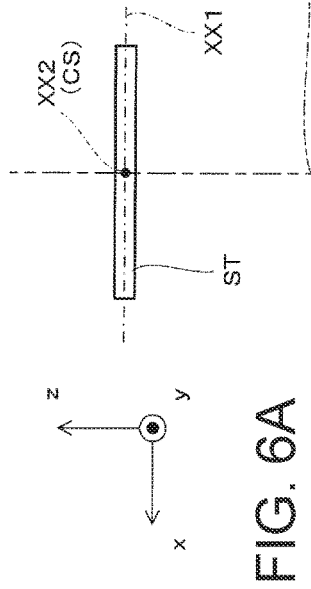
FIG. 6C conceptually shows how the stop shown in FIG. 6A looks when viewed along a projection system optical axis.
Figure 6D:
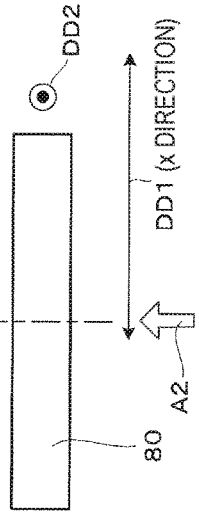
FIG. 6D conceptually shows how the stop shown in FIG. 6B looks when viewed along a specific direction.
Figure 6E:
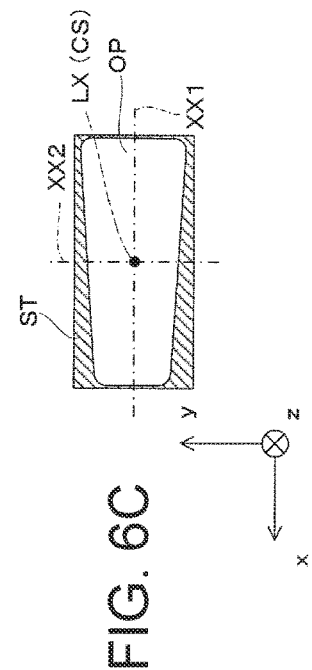
FIG. 6E conceptually shows how the stop shown in FIG. 6B looks when viewed along the projection system optical axis.

The structure of the stop ST provided in the projection lens 30 will be described below with reference to FIGS. 5A and 5B and FIGS. 6A to 6E. FIG. 5A is a cross-sectional view showing the configuration of an example of the projection lens 30, and FIG. 5B is a front view of the lens barrel 39, which forms the projection lens 30. FIG. 6A conceptually shows the arrangement of the image display apparatus 80 and the stop ST in the projection lens 30 in the example shown in FIGS. 5A and 5B. FIG. 6B conceptually shows a variation of the arrangement of the image display apparatus 80 and the stop ST in the projection lens 30. FIG. 6C conceptually shows the state of the stop ST shown in FIG. 6A viewed along the lens optical axis LX, which is the projection system optical axis. FIGS. 6D and 6E conceptually show the state of the stop ST shown in FIG. 6B viewed along a specific direction and the projection system optical axis.

The example shown in FIGS. 5A, 5B, 6A, and 6C will first be described below. In the description, it is assumed that the stop ST is provided as part of the inner surface of the lens barrel 39, as shown in the figures. The stop ST is disposed at the location where the largest number of pencil of lights of the video image light GL are superimposed on one another in the projection lens 30 (see FIGS. 2 and 3 and other figures, for example), that is, in a position in the lens barrel 39 where the cross-sectional area of the pencil of light of the video image light GL is minimized, so that the stop ST appropriately stops down the video image light GL. Further, the stop ST has a frame-shaped structure located between the second lens 32 and the third lens 33 and so disposed as to be orthogonal to the lens optical axis LX, as shown in FIG. 5A. In particular, the stop ST has a trapezoidal shape in the front view, as shown in FIG. 5B. As a result, in the asymmetric state described above, unnecessary light is appropriately removed in correspondence with the sub-pencils of light that exit from the image plan OI, whereby no unwanted light (ghost light) is produced inside and outside of video images.

The shape and structure of the stop ST will be described below in more detail. In the embodiment, as shown in FIGS. 5A and 5B, it is first assumed that the x direction is the first direction DD1 and the y direction is the second direction DD2, as in the above description. In other words, the first direction DD1 is the direction orthogonal to the direction of a normal to the image plane OI (Z direction in which lens optical axis LX in FIG. 2 extends) and corresponding to the light guide direction (direction in which light guide axis DX in FIG. 2 extends) of the light guide member 10 (direction extending in the XZ plane in FIG. 2, as the light guide direction extends), and the second direction DD2 is the direction orthogonal to both the direction of a normal to the image plane OI and the first direction DD1. Further, the first direction DD1 and the second direction DD2 are defined as follows from a viewpoint of the projection lens 30: The first direction DD1 is one of the in-plane directions (horizontal direction) in a plane (xy plane) orthogonal to the lens optical axis LX of the projection lens 30; and the second direction DD2 is the direction orthogonal to the first direction DD1 or the other one (vertical direction) of the in-plane directions. Further, in the description, it is assumed that in the stop ST, a first axis XX1 is an axis that intersects the lens optical axis LX, which passes through the center of the image plane OI, and is parallel to the first direction DD1, and that a second axis XX2 is an axis that intersects the lens optical axis LX and is parallel to the second direction DD2, as shown in FIGS. 5B and 6A. Further, the point where the first axis XX1 and the second axis XX2 intersect the lens optical axis LX is called an intersection CS, as shown in FIG. 6A and other figures. The intersection CS represents the center of the stop ST. Moreover, the plane containing the first axis XX1 and the lens optical axis LX (zx plane) is called a first flat plane KS1, and the plane containing the second axis XX2 and the lens optical axis LX (yz plane) is called a second flat plane KS2. In the case described above, in correspondence with the asymmetry of the sub-pencils of light that form the video image light GL along the first direction DD1 and the symmetry of the sub-pencils of light along the second direction DD2, a quadrangular opening OP formed by the stop ST has a shape symmetric with respect to the first axis XX1 but asymmetric with respect to the second axis XX2. Further, on the basis of the first flat plane KS1 and the second flat plane KS2, the opening OP is symmetric with respect to the first flat plane KS1 (mirror symmetry) and is asymmetric with respect to the second flat plane KS2. In particular, in the case shown in FIG. 5B, the opening OP has an isosceles trapezoidal shape (quadrangular shape) that spreads symmetrically with respect to the first axis XX1 from the outer side toward the inner side of the lens barrel 39. In the case described above, when the intersection CS is viewed from one point on the lens optical axis LX along the lens optical axis LX (that is, along direction indicated by arrow A2), the opening OP has a shape conceptually illustrated in FIG. 6C around the intersection CS.

A variation shown in FIGS. 6B, 6D, and 6E will next be described. FIG. 6B conceptually shows the arrangement of the image display apparatus 80 and the stop ST in the projection lens 30, as described above, and corresponds to FIG. 6A. In FIG. 6B, the first axis XX1 and other factors are described in the same manner as specified in FIG. 6A for direct comparison with FIG. 6A. In the example described above, the stop so disposed as to be orthogonal to the direction of a normal to the image plane OI (Z direction in which lens optical axis LX in FIG. 2 extends) is shown by way of example. In contrast, the stop ST in the present variation is so provided that the rectangular opening OP inclines with respect to the projection system optical axis, as shown in FIG. 6B. That is, comparison with FIG. 6A shows that the stop ST shown in FIG. 6B is so disposed as to be rotated around the y axis from the orthogonal arrangement shown in FIG. 6A to achieve an inclined arrangement. FIG. 6D is a front view conceptually showing the shape of the opening OP of the stop ST in the inclined arrangement. That is, FIG. 6D shows the stop ST viewed in the direction indicated by the arrow A1 in FIG. 6B, which is the forward direction of the opening OP (direction obtained by rotating the direction A2 around the y axis by the amount equal to the amount by which the stop ST is rotated), with the intersection CS located at the center of the view. When the stop ST is viewed as described above, the shape of the opening OP appears to be a rectangle (oblong). On the other hand, FIG. 6E shows the opening OP when the intersection CS is viewed from one point on the lens optical axis LX along the lens optical axis LX (that is, along direction indicated by arrow A2). When the stop ST is viewed as described above, the shape of the opening OP appears to be an isosceles trapezoidal. As described above, when the stop ST is so disposed as to incline with respect to the lens optical axis LX, that is, when the stop ST is disposed in a non-orthogonal arrangement, the shape of the opening appears to be a trapezoid in a front view even in the case where the opening actually has, for example, a rectangular shape (oblong shape) instead of a trapezoidal shape. Unnecessary light can be more exactly removed by setting the degree of inclination of the stop ST with respect to the lens optical axis LX in correspondence with the change in the exit angle. From a different point of view, in this case, light blocking is spatially (three-dimensionally) performed in consideration of the depth direction along the lens optical axis LX. In this case, the stop ST is not necessarily formed along a non-orthogonal flat plane and may be formed along a curved plane (non-flat plane).

The state in which the light exits from the image display apparatus 80 will be described below from another point of view. The light that exits from the image display apparatus 80 has an angle/luminance characteristic that greatly depends on the pixel opening shape. In general, the greater the opening shape, the greater the full value half angle of the angle/luminance characteristic, that is, light of high luminance exits even in a direction inclining by a large angle with respect to a normal to the panel, and the smaller the opening shape, the smaller the full value half angle, resulting in a peaky characteristic. In particular, in an ultra-compact display device used in an HMD, such as the virtual image display apparatus 100 according to the present embodiment, the size of the opening shape of one pixel is smaller than 10 µm in some cases. In such cases, the luminance in a direction inclining, for example, by about 20° with respect to a normal to the image plane OI is undesirably smaller than 50% of the luminance in the direction of the normal. As a result, luminance unevenness occurs in video images in some cases. In particular, in a case where an optical system that causes the state of a pencil of light to vary in accordance with the on-panel position where the pencil of light exits is employed, as in the present embodiment, luminance unevenness can be a big problem. To avoid the problem, in the present embodiment, the pixel layout is so adjusted that a pixel from which light exits at a larger exit angle has a larger opening for suppression of occurrence of the luminance unevenness. In the present embodiment, to allow the adjustment to be so made that the exit angle along the second direction DD2 (y direction) varies in accordance with the position in the first direction DD1 (x direction), each opening may be so structured as to be, for example, larger in the second direction DD2 than in the first direction DD1, and the size of the opening of each pixel may be changed in accordance with the position of the pixel in the first direction DD1. Instead, the panel substrate structure can be so configured that the luminance at a certain angle with respect to the direction of a normal to the panel is maximized. That is, in the pencil of light that exits from the image display apparatus 80, the direction of a light beam that exits from a pixel and has the highest luminance varies in accordance with the position of the pixel in the image display apparatus 80.

A more specific example of the optical configuration of the image display apparatus 80 of the virtual image display apparatus 100 will be described below in detail with reference to FIGS. 7A and 7B.

First, the image display apparatus 80 is a self-luminous image display apparatus including not only the image generator 81 and the color filter layer CF, which is disposed as the light orientation controller 82 in a position immediately downstream of the image generator 81, but also the drive controller (not shown) that controls the action of the image generator 81, as described above. An example of the configuration of the image display apparatus 80 will be more specifically described with reference to FIGS. 7A and 7B. The image generator 81 of the image display apparatus 80 includes a plurality of transparent electrodes (anodes) 71a, which are pixel electrodes, a counter electrode (cathode)

72a, an organic EL layer 73a, which is disposed between the transparent electrodes 71a and the counter electrode 72a and serves as a light emission functional layer (light emitting layer), and a protective layer 74a. The color filter layer CF as the light orientation controller 82 is formed on the protective layer 74a. The color filter layer CF is formed of color filter sections CFr, CFg, and CFb for red, green and blue, and the color filter sections CFr, CFg, and CFb for the three colors are arranged in a matrix in correspondence with the plurality of transparent electrodes (anodes) 71a, which are pixel electrodes. In the thus configured image display apparatus 80, the electrodes 71a and 72a are caused to operate as appropriate to allow the organic EL layer 73a to emit light, whereby the image generator 81 outputs the video image light GL from the image plane OI. That is, the image display apparatus 80, which includes the organic EL device as a light source, emits the video image light GL from each of the pixels that form the image plane OI. Further, when the light emitted by the image generator 81 passes as the video image light GL through the color filter layer CF, the image display apparatus 80 outputs color video image light (image light) GL. In the present embodiment, in the color filter layer CF as the light orientation controller 82, the color filter sections CFr, CFg, and CFb for the three colors are so arranged that the interval therebetween differs from the interval between the matrix-arrangement pixels that form the image plane OI, that is, the interval between the plurality of matrix-arrangement transparent electrodes 71a, 71a, 71a. As a result, the positions of the color filter sections CFr, CFg, and CFb for the three colors are shifted from the positions of the corresponding electrodes 71a, 71a, 71a in the periphery of the image generator 81 that is separate from the lens optical axis LX, which is the central optical axis of the image display apparatus 80, as shown in FIG. 7A (in FIG. 7A, the positions of the color filter sections CFr, CFg, and CFb for the three colors are shifted rightward, or the positions of the outer edges of the color filter sections are shifted from the positions of the electrodes), whereby the orientation of the light components that exit through the color filter layer CF inclines in an oblique direction (diagonally right direction in FIG. 7A), and the light components therefore so exit as to approach the lens optical axis LX. On the other hand, in the vicinity of the lens optical axis LX of the image display apparatus 80, that is, in a central side of the image display apparatus 80, the shift described above does not occur or the amount of the shift is small if any, whereby the orientation of the exiting light components does not incline, and the light components exit vertically or roughly vertically. Adjusting the degree of the inclination of the exiting light on a position basis or on a certain-area-region basis allows a desired light exiting state (asymmetric state) to be achieved.

The above description as a whole can be expressed differently as follows: In the image display apparatus 80, the image generator 81 is a pixel matrix formed by arranging pixels in a matrix in the form of the plurality of transparent electrodes 71a, which are pixel electrodes, in the image plane OI; and the color filter layer CF as the light orientation controller 82 has a shape that varies in accordance with the position in the image plane OI in such a way that the interval between the color filter sections is shifted from the interval between the matrix-arrangement pixels that form the image plane OI (interval between transparent electrodes 71a) by a value that increases with distance from the center toward the periphery of the color filter layer CF. The configuration described above allows control of the light orientation state to be optimized for each position in the image plane OI. That is, in the light that exits from each position in the image plane OI, a light beam that exits at an angle corresponding to a principal ray of the light is maximized in terms of optical intensity. As a result, the color filter layer CF as the light orientation controller 82 controls the light component that exits from each position in the image plane OI in such a way that the exiting light has an intensity distribution in which the intensity is maximized in the axial direction of the principal ray of the light. As described above, in the present embodiment, the color filter layer CF functions as the light orientation controller 82, which controls the orientation of the video image light GL, which is the exiting light.

As described above, in the projection lens 30 of the virtual image display apparatus 100 according to the present embodiment, the lens surface 33a, which is located in a position where light components that should reach the viewer's eye in the pencil of light of the video image light that exits from each of the two points P1 and P2 in the different corner regions IA and OA in the image plane OI, which is the light exiting plane of the image display apparatus 80, do not intersect one another, is a nonaxisymmetric aspheric surface, whereby the size of the optical system can be further reduced and the size of the overall apparatus can therefore be reduced with a variety of types of optical precision, such as the resolution and angle of view, maintained. In this case, in particular, providing the stop ST, which forms the asymmetric quadrangular opening OP, allows appropriate light adjustment at the stop ST even when the pencils of light from the points in the image display apparatus 80 exit at different angles along the second direction DD2 as described above, whereby high-quality video images can be provided.

In the above description, the opening OP formed by the stop ST has a quadrangular shape, but not necessarily, and the opening OP may have a different shape to the extent that the different shape does not adversely affect, for example, the optical system. That is, the opening OP of the stop ST can have any other shape, for example, as follows: Part of the opening OP having the quadrangular shape described above can be deformed, for example, part of the quadrangular shape can be recessed inward or can protrude outward, or the opening OP can have a triangular shape.

Figure 7A:
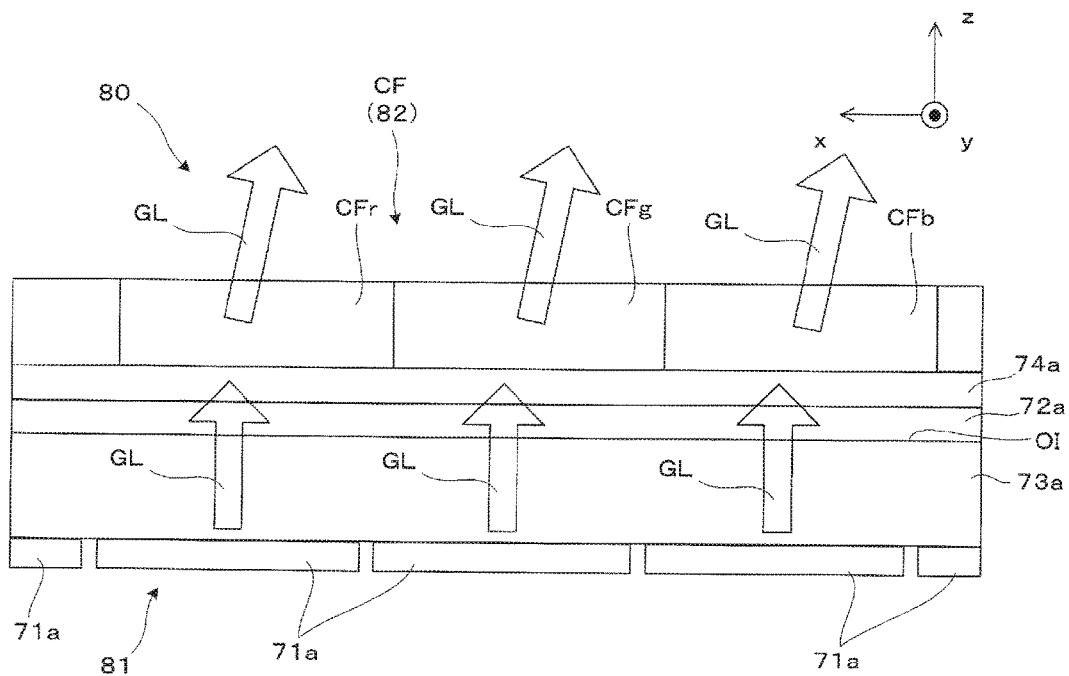
FIG. 7A is a conceptual view showing the periphery of an image display apparatus having an exemplary configuration.
Figure 7B:
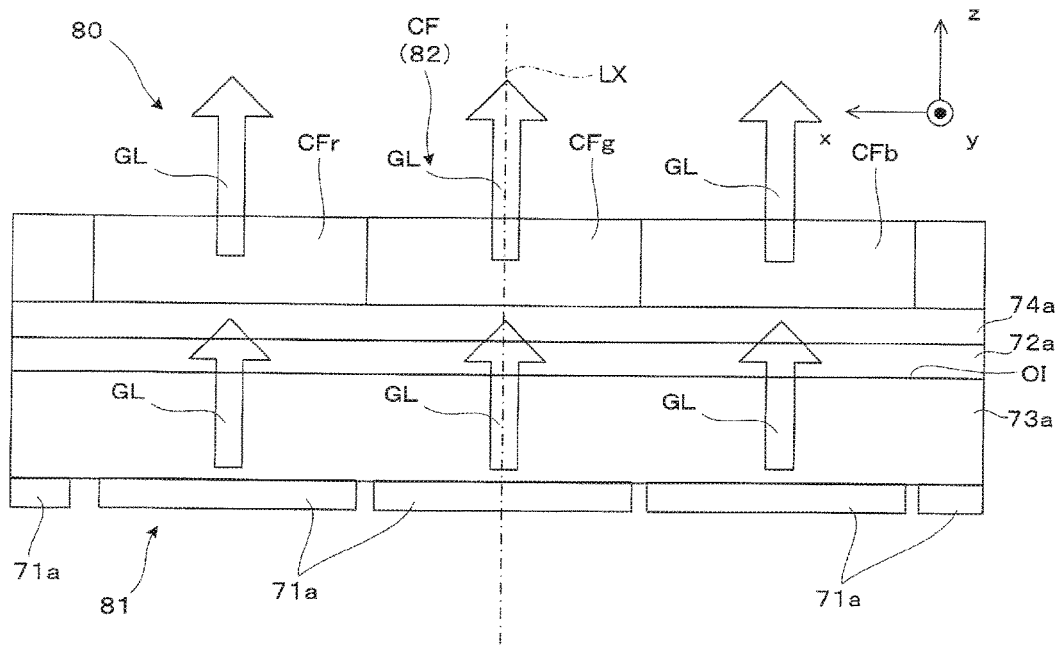
FIG. 7B is a conceptual view showing a central side of the apparatus.
Figure 8:
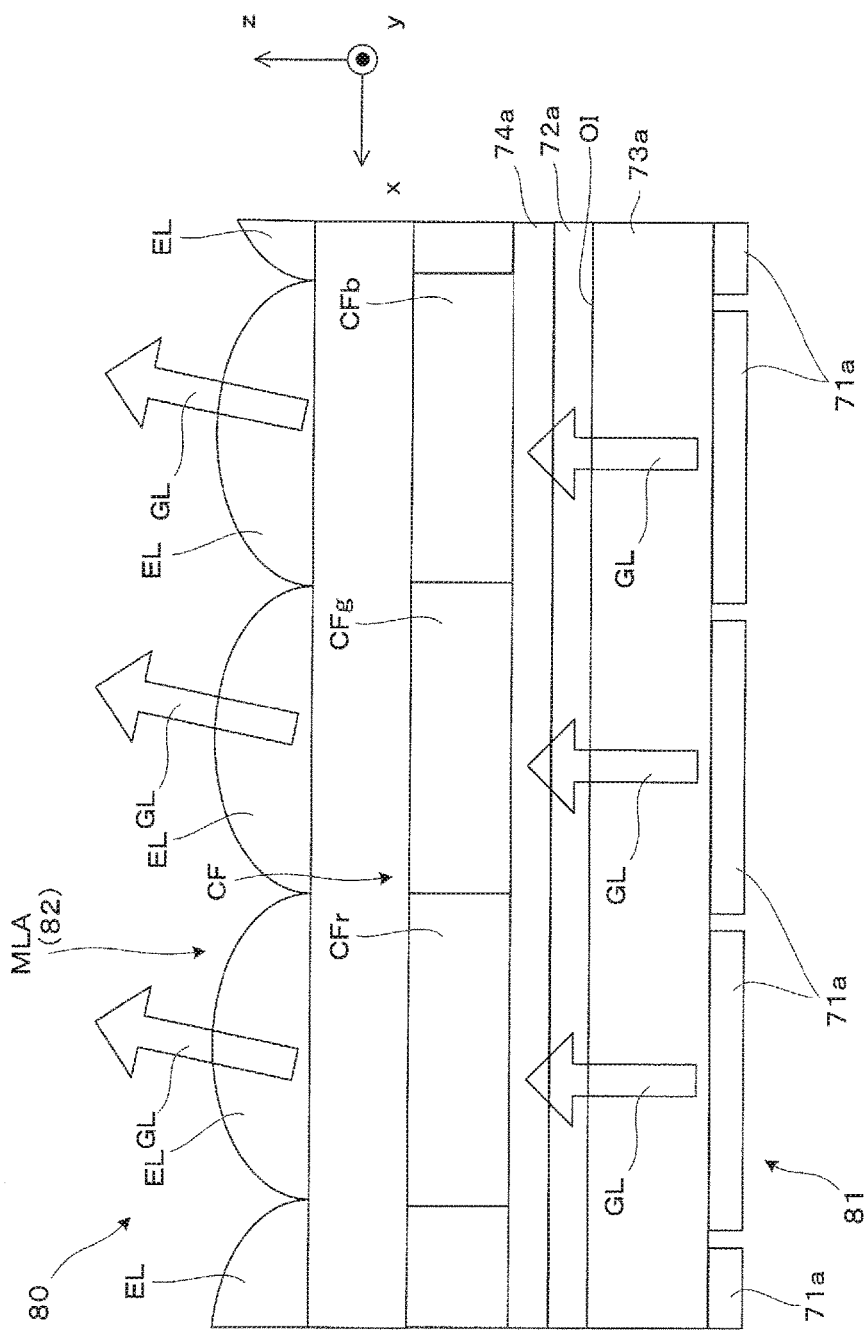
FIG. 8 is a conceptual view for describing a variation of the image display apparatus.

FIG. 8 is a conceptual view for describing a variation of the image display apparatus 80 and corresponds to FIG. 7A. In the variation shown in FIG. 8, a microlens array MLA is disposed on the color filter layer CF. In the present variation, the microlens array MLA functions as the light orientation controller 82, or the microlens array MLA cooperates with the color filter layer CF to function as the light orientation controller 82. Specifically, a plurality of element lenses EL, which form the microlens array MLA, are arranged in a matrix in correspondence with the color filter sections CFr, CFg, and CFb for the three colors, and the shapes of the element lenses EL are non-uniformly configured with respect to the pixel arrangement and in accordance with the positions where the color filter sections CFr, CFg, and CFb for the three colors are disposed, that is, the positions of the matrix-arrangement pixels that form the image plane OI (positions of electrodes 71a). Specifically, for example, the outer shapes of the element lenses EL differ from one another, the positions of the element lenses EL are so arranged as to be shifted from the positions of the corresponding pixels, or the microlens array MLA is so arranged that the interval between the microlenses is smaller than the interval between the pixels. As a result, the microlens array MLA alone or the microlens array MLA that cooperates with the color filter layer CF functions as the light orientation controller 82, which adjusts the light components that form the video image light GL. In other words, the microlens array MLA functions as a deflection member that changes the angle of exiting light.

Others

The invention has been described above with reference to the embodiment, but the invention is not limited to the embodiment described above and can be implemented in a variety of other aspects to the extent that they do not depart from the substance of the invention. For example, the above description has been made of a see-through virtual image display apparatus, and the structure shown in the present embodiment can be used in a non-see-through-type virtual image display apparatus.

In the above description, the image generator 81 including an OLED (organic EL) is used as the image display apparatus (video device) 80, but not necessarily, and the image display apparatus 80 can be formed of a transmissive liquid crystal display device and a backlight, or any of a variety of other components can be used to form the image display apparatus 80.

Figure 9:
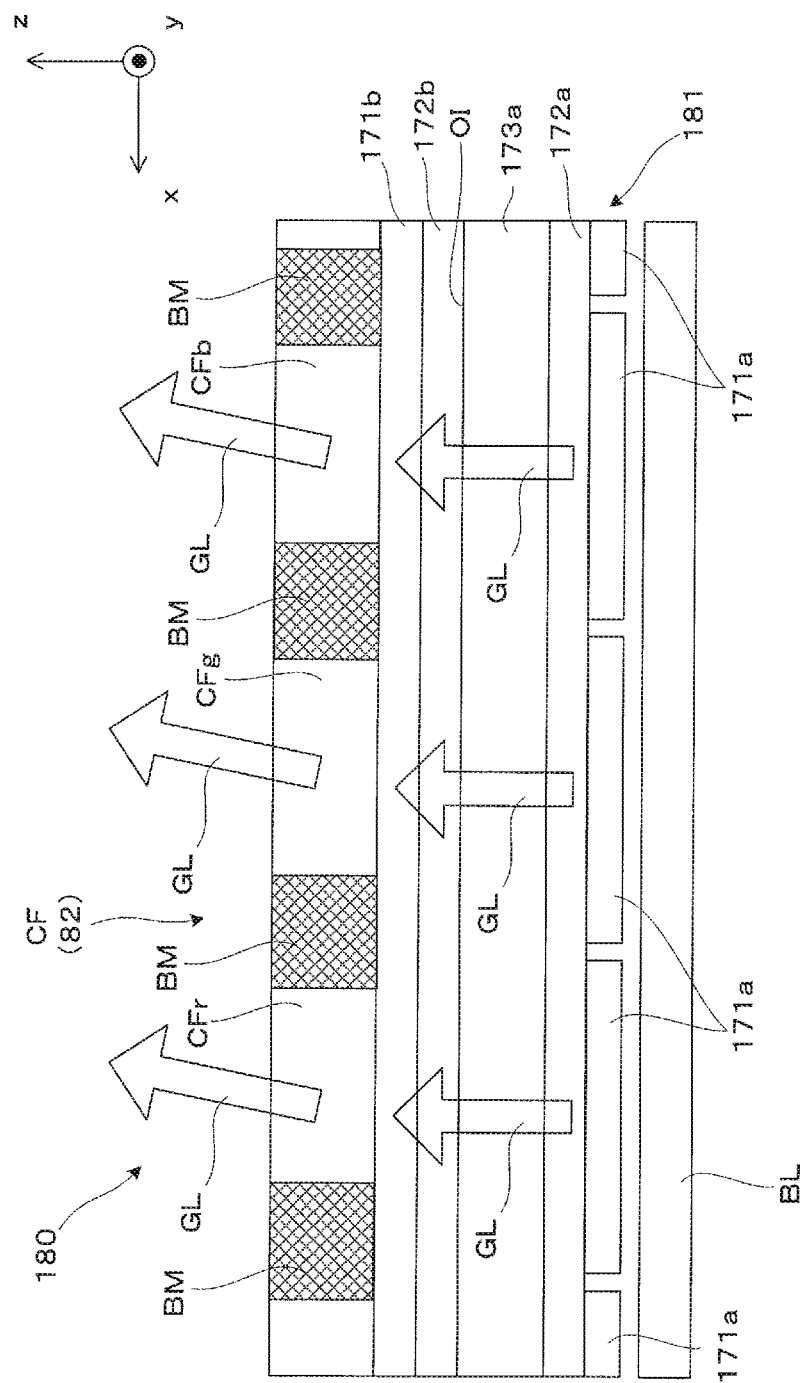
FIG. 9 is a conceptual view for describing another variation of the image display apparatus.

FIG. 9 is a conceptual view for describing another variation of the image display apparatus. In an image display apparatus 180 according to the variation shown in FIG. 9, a transmissive liquid crystal display device is used, and an image generator 181 is formed of a liquid crystal panel and includes a TFT pixel structure and a black matrix structure. That is, a pair of transparent electrodes 171a and 171b and a pair of orientation films 172a and 172b sandwich a liquid crystal layer 173a with the color filter layer CF provided, and light radiated from a backlight BL, which is light source light, is modulated. In this configuration, a black matrix BM is provided between the color filter sections CFr, CFg, and CFb for the three colors, which form the color filter layer CF. In the present variation, the shape of the black matrix BM is changed in accordance with the positions where the color filter sections CFr, CFg, and CFb for the three colors are disposed, that is, the positions of the matrix-arrangement pixels that form the image plane OI (positions of electrodes 171a), and the configuration described above is allowed to function as the light orientation controller 82, which adjusts the light components that form the video image light GL. The structure described above can be expressed in another way as follows: The interval in the TFT pixel structure differs from the interval in a counter substrate pixel structure having the black matrix structure.

Further, for example, a configuration using a reflective liquid crystal display device is conceivable, and a digital micromirror device or any other similar device can be used in place of the image generator 81 formed, for example, of a liquid crystal display device. An LED array can, for example, be used as the self-luminous element.

In the embodiment described above, the panel-type image display apparatus 80 including an OLED (organic EL) is used, and a sweep-type image display apparatus can be used in place of the panel-type image display apparatus 80. Specifically, for example, a light diffusion element may be disposed in the image plane OI, and a sweep-type illumination system may be used to sweep light in the position of the image plane OI to form an image, which may be allowed to exit in the form of video image light on the basis of the diffusion effect of the light diffusion element. The same configuration described in the embodiment can be used with the sweep-type image display apparatus.

In the embodiment described above, the right and left light guide apparatus 20 are separately manufactured, but not necessarily, for example, a configuration in which the light transmissive member is shared can be employed. FIGS. 10A and 10B are conceptual views for describing a variation of the light guide apparatus. In this example, a pair of right and left light guide members 10, 10 and a light transmissive member 150 form a unitary optical member in which the pair of right and left light guide members 10, 10 sandwich the single light transmissive member 150 so as to be connected to each other and which functions as a light guide apparatus 20 that is a unitary apparatus from right to left. In this case, the light transmissive member 150 allows positioning for binocular vision to be readily and precisely performed. For example, bending the light transmissive member 150 at a central section CE by an appropriate amount allows the right and left angles to be specified, as shown in FIG. 10A. Further, providing recessed sections CVa and CVb in the upper and lower ends in the central section CE, as shown in FIG. 10B, allows the recessed sections CVa and CVb to be used not only in positioning (position fixing) for bonding and fixing the light guide members 10, 10 to the light transmissive member 150 in a manufacturing step but also as a location for providing the nose receiver.

Figure 11A:
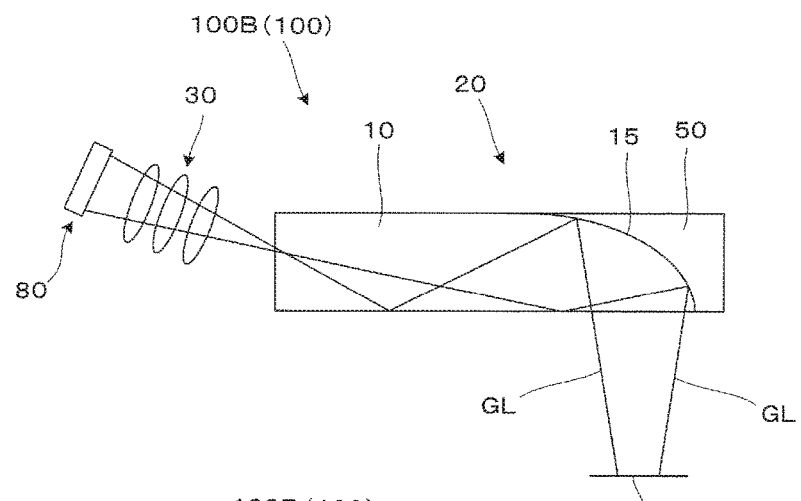
FIG. 11A conceptually shows another example of the virtual image display apparatus, and FIG. 11B conceptually shows still another example of the virtual image display apparatus.
Figure 11B:
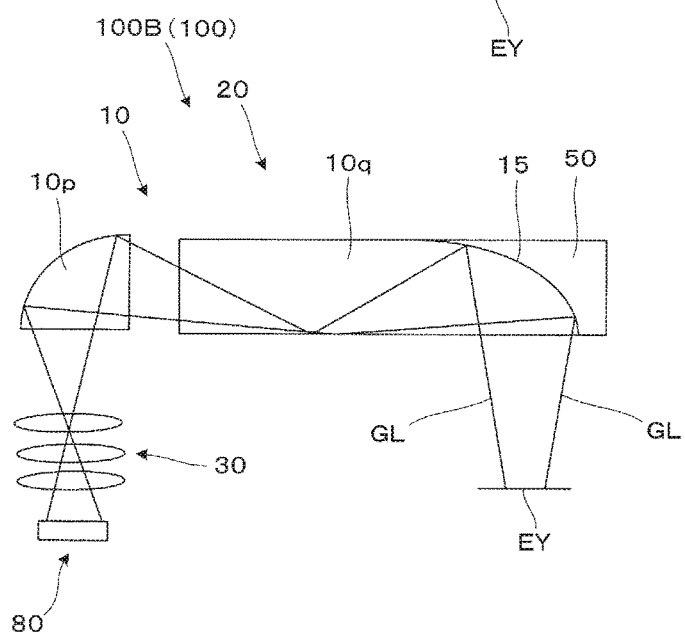

In the above description, the sections of the light guide apparatus 20 that range from the light incident section (second light guide section 12) to the light exiting section (first light guide section 11) are formed of a single member. Instead of the configuration described above, for example, the video image light GL may be caused to directly enter a total-reflection-based light guide section without causing the video image light GL to travel via a light reflection surface formed, for example, of the light reflection film RM (see FIG. 2), as shown in FIG. 11A, or the light guide member 10 of the light guide apparatus 20 may be divided into a light incident section 10p and a light guide section 10q, each of which is formed, for example, of a prism, as shown in FIG. 11B. Further, regarding the total reflection, only one of surfaces of the light guide section that face each other and extend is involved in the total reflection but the other surface is not before the light is extracted, as shown in FIGS. 11A and 11B.

Figure 12:
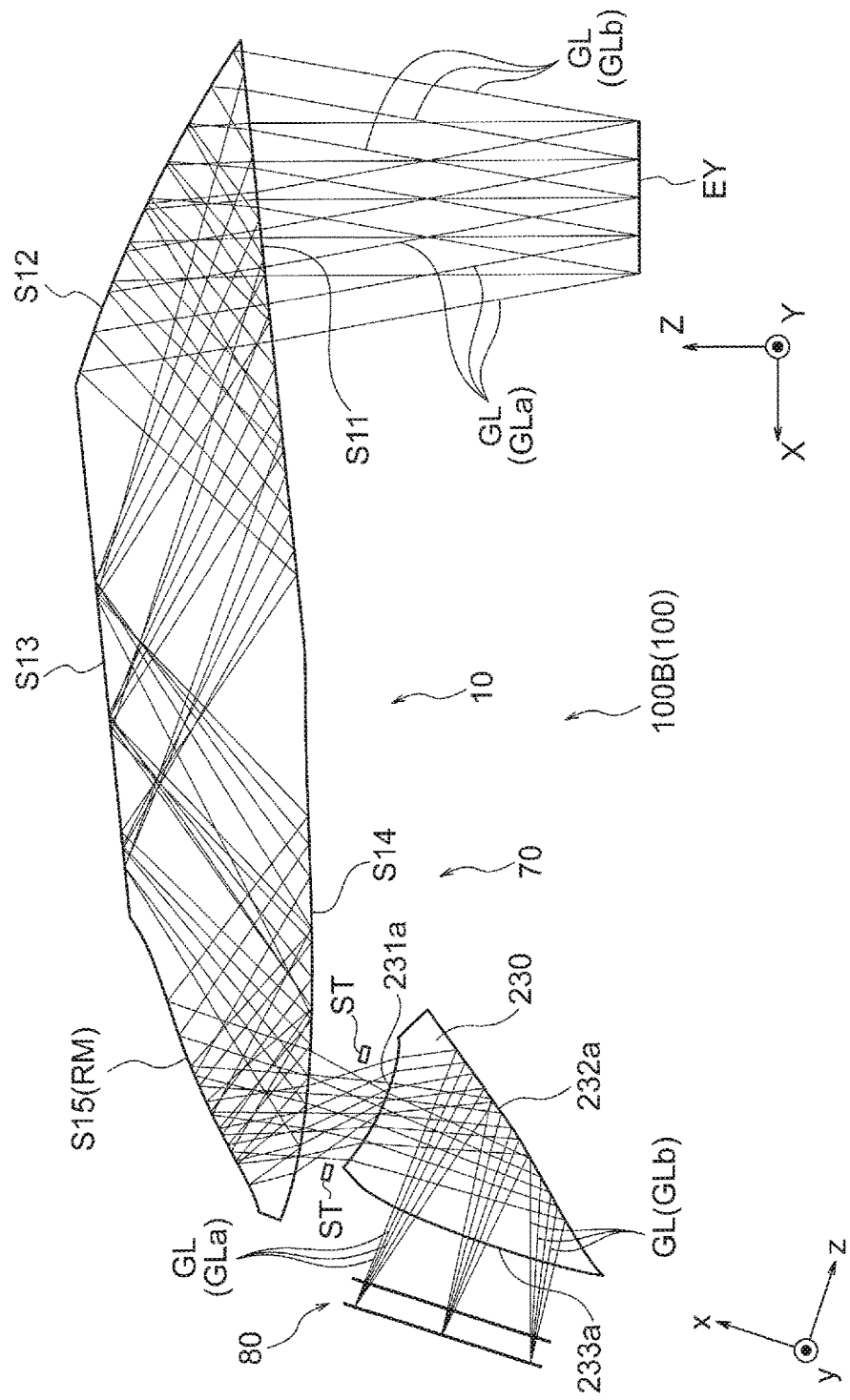
FIG. 12 is a plan view showing the optical path in a main body section in still another example of the virtual image display apparatus.

In the above description, the projection lens 30, which is formed of a plurality of lenses, is employed as the projection system, but not necessarily, and a projection prism system 230, which is formed of a prism-shaped member, may be used to form the projection system, as shown in FIG. 12. In this case as well, for example, among surfaces 231a to 233a, which contribute to optical path deflection in the projection prism system 230, the light incident surface 233a, which is located in a position where in the pencil of light of the video image light that exits from the image display apparatus 80, the sub-pencils of light GLa and GLb, which are light components that should reach the viewer's eye, do not intersect each other, is a nonaxisymmetric aspheric surface (free-form surface) for appropriate aberration correction. It is noted that the reflection surface 232a and/or the light exiting surface 231a, which are surfaces other than the light incident surface 233a, may also be a nonaxisymmetric aspheric surface (free-form surface). Further, in FIG. 12, the projection prism system 230, which is the projection system, and the light guide apparatus 20 (light guide member 10) are not connected to each other but are separate members. Instead, the projection prism system 230 and the light guide apparatus 20 (light guide member 10) can be connected to each other to form a unitary member. In this configuration, for example, providing a stop ST having a nonlinear shape corresponding to the sub-pencils of light and disposed in correspondence therewith as described above in a position downstream of the projection prism system 230 allows appropriate light blockage.

In the above description, the obliquely disposed stop ST has been described as a variation with reference to FIG. 6B and other figures. How to arrange the opening OP and the shape thereof in the oblique arrangement are not limited to those described above, and a variety of other aspects can be employed. For example, the inclination direction shown in FIG. 6B and other figures may be reversed, as shown in FIGS. 13A to 13C. The arrangement and shape of the stop ST can be optimized in accordance with the difference in the shape of the pencil of light, the type of light to be handled, and a variety of other situations. For example, factors of the shape of the opening OP, such as which of the right and left sides of the opening OP in the horizontal direction is larger than the other, can be changed as appropriate. Further, a stop ST having a trapezoidal opening OP in a front view may be obliquely disposed, as shown in FIGS. 13D and 13E.

In the above description, the half-silvered mirror layer (semi-transmissive/reflective film) 15 is formed in a horizontally elongated rectangular region. Instead, the contour of the half-silvered mirror layer 15 can be changed as appropriate in accordance with the application and other specifications of the apparatus. The transmittance and reflectance of the half-silvered mirror layer 15 can also be changed in accordance with the application and other factors of the apparatus.

The above description has been made of the virtual image display apparatus 100 including the pair of display apparatus 100A and 100B. The virtual image display apparatus 100 can instead be formed of a single display apparatus. That is, instead of providing the set of the projection/see-through apparatus 70 and the image display apparatus 80 in correspondence with each of the right and left eyes, only one of the right and left eyes may be provided with the projection/see-through apparatus 70 and the image display apparatus 80 for monocular vision of an image.

In the above description, the half-silvered mirror layer 15 is a simple semi-transmissive film (dielectric multilayer film). The half-silvered mirror layer 15 can be replaced with a planar or curved hologram element. Still instead, the half-silvered mirror layer 15 can be replaced with an optical element having a plurality of minute reflection surfaces arranged on a curved surface, a Fresnel mirror, or any other diffraction element.

In the above description, the light guide member 10 and other components extend in the horizontal direction along which the eyes EY are arranged. The light guide member 10 may instead be so disposed as to extend in the vertical direction. In this case, the light guide member 10 has a parallel arrangement structure instead of the serial arrangement structure.

In the above description, the stop ST is provided as part of the inner surface of the lens barrel 39, but not necessarily. For example, the following configurations are conceivable: a configuration in which a member that forms the stop ST is attached to a surface or any other portion of a prism that forms the projection lens 30 or the light guide apparatus 20; a configuration in which the stop ST is formed of a frame-shaped member that is a member separate from the lens barrel 39; or the stop ST is formed of the combination of an inner portion of the lens barrel 39 and another member. The other member may, for example, be separate members that block upper and lower portions of light, and the separate members may be combined with the inner side surface of the lens barrel 39 to form a frame-like shape that forms the stop ST.

The invention of the present application is also applicable to a case where an HMD is formed of a unitary optical engine unit that is of a monocular type or a binocular type and incorporates components ranging, for example, from a video device (image display apparatus 80) to a light guide member (light guide member 10 or light guide apparatus 20).

The entire disclosure of Japanese Patent Application No. 2015-253152, filed Dec. 25, 2015 is expressly incorporated by reference herein.

What is claimed is:

1. A virtual image display apparatus comprising:
a video device that generates video image light;
a light guide member that guides the video image light from the video device based on total reflection that occurs at a plurality of surfaces including a nonaxisymmetric curved surface and serves as part of an optical system to form an intermediate image in the light guide member; and
a projection system that causes the video image light from the video device to enter the light guide member,
wherein an in-plane direction in a plane orthogonal to a projection system optical axis of the projection system is called a first direction and a direction that is another one of the in-plane directions and orthogonal to the first direction is called a second direction, and
wherein the projection system has a stop that forms an opening that is (1) symmetric with respect to a first flat plane including the projection system optical axis and a first axis that extends in parallel to the first direction and intersects the projection system optical axis, the projection system optical axis being an axis that passes through the center of an image plane but (2) asymmetric with respect to a second flat plane including the projection system optical axis and a second axis that extends in parallel to the second direction and intersects the projection system optical axis, the opening continually increasing in width along the first axis direction.

2. The virtual image display apparatus according to claim 1, wherein in the projection system, the stop is so disposed as to be orthogonal to the projection system optical axis, and a shape of the opening is symmetric with respect to the first axis but asymmetric with respect to the second axis.

3. The virtual image display apparatus according to claim 1, wherein in the projection system, the stop is so disposed as not to be orthogonal to the projection system optical axis.

4. The virtual image display apparatus according to claim 3, wherein the stop is so disposed that a stop orthogonal to the projection system optical axis is rotated around the second axis by a predetermined angle to achieve the non-orthogonal arrangement.

5. The virtual image display apparatus according to claim 3, wherein the opening of the stop has a quadrangular shape.

6. The virtual image display apparatus according to claim 1, wherein in the projection system, the projection system optical axis is parallel to a direction of a normal to a light exiting plane of the video device and passes through a center of the video device.

7. The virtual image display apparatus according to claim 1, wherein the video device has a rectangular light exiting plane, and a longitudinal direction and a widthwise direction of the light exiting plane correspond to the first direction and the second direction, respectively.

8. The virtual image display apparatus according to claim 1, wherein in the light guide member, a light guide direction is a direction parallel to the first flat plane.

9. The virtual image display apparatus according to claim 1, wherein in the projection system, the stop is provided as part of an inner surface of a lens barrel that fixes a lens group that forms the projection system.

10. The virtual image display apparatus according to claim 9, wherein the stop is provided in a position where a cross-sectional area of a pencil of light is minimized in the lens barrel.

11. The virtual image display apparatus according to claim 1, wherein the projection system includes at least one nonaxisymmetric aspheric surface, and the one nonaxisymmetric aspheric surface is located in a position where in a pencil of light of video image light that exits from each of two points in different corner regions of a light exiting plane of the video device, light components that should reach a viewer's eyes do not intersect each other.

12. The virtual image display apparatus according to claim 1, wherein the video device causes pencils of light to exit from pixels arranged along the first direction at exit angles different from one another along the second direction.

13. The virtual image display apparatus according to claim 1,
wherein the light guide member has at least two nonaxisymmetric curved surfaces,
among the plurality of surfaces that form the light guide member, a first surface and a third surface are so located as to face each other, and the first surface and the third surface provide diopter of roughly zero when an outside scene is visually recognized through the first surface and the third surface, and
the video image light from the video device is totally reflected off the third surface, is totally reflected off the first surface, is reflected off a second surface, then passes through the first surface, and reaches an observation side.

14. The virtual image display apparatus according to claim 1, wherein an exit angle of a pencil of light of the video image light that exits from the video device is asymmetric with respect to a center of the video device.

15. The virtual image display apparatus according to claim 1, wherein in a pencil of light that exits from each pixel of the video device, a direction of a light beam having highest luminance varies in accordance with a position of the pixel of the video device.

16. The virtual image display apparatus according to claim 1, wherein the nonaxisymmetric curved surface of the light guide member is provided at least on a light incident section disposed on a light incident side and a light exiting section disposed on a light exiting side.

17. The virtual image display apparatus according to claim 1, wherein the light guide member has a semi-transmissive/reflective section that partially reflects and transmits the video image light from the video device and outside light, and the light guide member is connected to a light transmissive member via the semi-transmissive/reflective section.

* * * * *